US012440084B2

(12) United States Patent
Licata et al.

(10) Patent No.: US 12,440,084 B2
(45) Date of Patent: Oct. 14, 2025

(54) WASHING MACHINE, COMPONENTS THEREOF AND METHODS OF CLEANING

(71) Applicant: Electrolux Professional, Inc., Vicksburg, MS (US)

(72) Inventors: Michael P. Licata, Lee's Summit, MO (US); Richard Powers, Overland Park, KS (US); David Gast, Lenexa, KS (US)

(73) Assignee: ELECTROLUX PROFESSIONAL, INC., Vicksburg, MS (US)

( * ) Notice: Subject to any disclaimer, the term of this patent is extended or adjusted under 35 U.S.C. 154(b) by 0 days.

(21) Appl. No.: 18/405,819

(22) Filed: Jan. 5, 2024

(65) Prior Publication Data

US 2024/0215794 A1 Jul. 4, 2024

Related U.S. Application Data

(63) Continuation of application No. 17/025,343, filed on Sep. 18, 2020, now Pat. No. 11,864,708, which is a (Continued)

(51) Int. Cl.
*A47L 15/00* (2006.01)
*A47L 15/08* (2006.01)
(Continued)

(52) U.S. Cl.
CPC ........... *A47L 15/0057* (2013.01); *A47L 15/08* (2013.01); *A47L 15/4208* (2013.01); *A47L 15/02* (2013.01); *A47L 15/16* (2013.01); *B08B 3/02* (2013.01)

(58) Field of Classification Search
CPC ...... A47L 15/16; A47L 15/18; A47L 15/0057; B05B 15/069
See application file for complete search history.

(56) References Cited

U.S. PATENT DOCUMENTS 3,568,935 A * 3/1971 Hoffman ................. A47L 15/42 239/587.5
4,972,861 A 11/1990 Milocco et al.
(Continued)

FOREIGN PATENT DOCUMENTS

AU 2015274383 B2 2/2020
AU 2020200896 B2 9/2021
(Continued)

OTHER PUBLICATIONS

"Corrected Notice of Allowability Received for U.S. Appl. No. 15/499,221, mailed on Jul. 21, 2020."
(Continued)

*Primary Examiner* — Michael E Barr
*Assistant Examiner* — Kevin G Lee
(74) *Attorney, Agent, or Firm* — Kutak Rock LLP

(57) ABSTRACT

A method of cleaning a washing machine and components and systems for enabling a user to clean the washing machine are provided. The method includes gaining access to debris that is trapped in otherwise inaccessible and/or concealed areas and/or directing debris out of inaccessible and/or concealed areas. The components include a jet channel that selectively couples to a discharge manifold in use and is removable to provide access to an interior area of the discharge manifold for cleaning. The systems include a removable mount assembly for accessories and a purging system for pumps and other concealed areas. The purging system is configured to discharge purging fluid through a plurality of purging ports and into concealed areas so as to direct debris in the concealed areas out of the concealed areas.

20 Claims, 23 Drawing Sheets

Related U.S. Application Data continuation of application No. 15/499,221, filed on Apr. 27, 2017, now Pat. No. 10,779,701, which is a continuation-in-part of application No. 14/738,105, filed on Jun. 12, 2015, now Pat. No. 10,292,562.

(60) Provisional application No. 62/174,330, filed on Jun. 11, 2015, provisional application No. 62/011,483, filed on Jun. 12, 2014.

(51) Int. Cl.

| | |
|---|---|
| ***A47L 15/42*** | (2006.01) |
| *A47L 15/02* | (2006.01) |
| *A47L 15/16* | (2006.01) |
| *B08B 3/02* | (2006.01) |

(56) References Cited

U.S. PATENT DOCUMENTS

| | | | | |
|---|---|---|---|---|
| 5,775,347 | A * | 7/1998 | Hoover | A47L 15/16 134/107 |
| 7,001,506 | B2 | 2/2006 | Anderson | |
| 7,246,624 | B2 | 7/2007 | Cantrell et al. | |
| 7,578,305 | B2 * | 8/2009 | Bigott | A47L 15/0092 134/108 |
| 10,292,562 | B2 | 5/2019 | Licata et al. | |
| 10,779,701 | B2 | 9/2020 | Licata et al. | |
| 11,864,708 | B2 | 1/2024 | Licata et al. | |
| 2006/0237050 | A1 | 10/2006 | Weaver et al. | |
| 2008/0011328 | A1 | 1/2008 | Cantrell et al. | |
| 2011/0017241 | A1 | 1/2011 | Cantrell et al. | |
| 2012/0031432 | A1 * | 2/2012 | Beaudet | A47L 15/4293 134/18 |
| 2015/0359407 | A1 | 12/2015 | Licata et al. | |
| 2017/0224188 | A1 | 8/2017 | Licata et al. | |
| 2021/0000321 | A1 | 1/2021 | Licata et al. | |

FOREIGN PATENT DOCUMENTS

| | | | |
|---|---|---|---|
| AU | 2021218202 | A1 | 9/2021 |
| WO | 2015192036 | A1 | 12/2015 |

OTHER PUBLICATIONS

"Final Office Action received for U.S. Appl. No. 17/025,343, Mailed on Apr. 26, 2023".

"First Examination Report Received for AU Application No. 2015274383, mailed on Feb. 12, 2019, 4 pages".

"First Examination Report Received for AU Application No. 2020200896, mailed on Dec. 3, 2020."

"First Examination Report Received for AU Application No. 2021218202, mailed on Feb. 20, 2023."

"International Preliminary Report on Patentability for International Application PCT/US2015/035603, Report issued Dec. 15, 2016, Mailed Dec. 22, 2016, 10 Pgs".

"International Search Report and Written Opinion for International Application No. PCT/US2015/035603, Search completed Sep. 14, 2015, Mailed Oct. 1, 2015, 9 Pgs".

"LG OTR Microwave—Cleaning the Grease Filters video, dated Mar. 8, 2013, available at https://www.youtube.com/watch?v=h0a00af1 inY."

"Non Final Office Action Received For U.S. Appl. No. 15/499,221, Mailed on Nov. 1, 2019, 13 Pages.", 13.

"Non- Final Office Action received for U.S. Appl. No. 17/025,343, Mailed on Oct. 6, 2022".

"Non-Final Rejection Received for U.S. Appl. No. 14/738,105 mailed on Apr. 17, 2017".

"Notice of Acceptance received for AU Application No. 2015274383, Mailed on Oct. 24, 2019."

"Notice of Acceptance Received for AU Application No. 2021218202, mailed on Dec. 18, 2023."

"Notice of Allowance Received for U.S. Appl. No. 15/499,221, mailed on May 18, 2020".

"Notice of Allowance Received for U.S. Appl. No. 17/025,343, mailed on Aug. 15, 2023".

"Notice of Allowance Received for U.S. Appl. No. 14/738,105, mailed on Nov. 2, 2017", 11 Pages.

* cited by examiner

WASHING MACHINE, COMPONENTS THEREOF AND METHODS OF CLEANING

CROSS-REFERENCE TO RELATED APPLICATIONS

This application is a continuation of co-pending U.S. patent application Ser. No. 17/025,343, filed Sep. 18, 2020, which is a continuation of co-pending U.S. patent application Ser. No. 15/499,221, filed Apr. 27, 2017, which is a continuation-in-part application of U.S. patent application Ser. No. 14/738,105, filed Jun. 12, 2015 and issued as U.S. Pat. No. 10,292,562 on May 21, 2019, which claims priority pursuant to 35 U.S.C. 119(e) to U.S. Provisional Patent Application Ser. No. 62/011,483, filed Jun. 12, 2014, and U.S. Provisional Patent Application Ser. No. 62/174,330, filed Jun. 11, 2015, the entire disclosures of which are incorporated herein by reference.

FIELD OF THE INVENTION

The present invention relates to a washing machine, components of a washing machine, and methods of cleaning a washing machine and/or components thereof. More particularly, embodiments of the present invention relate to a to a continuous motion washing machine.

BACKGROUND OF THE INVENTION

Continuous motion pot and pan (as well as produce and other items) washing machines of the type used in restaurants, institutions and other eating facilities often involve a large wash tank or basin in which wash fluid is circulated to provide a rolling wash action for the pots and pans. One such machine is described in U.S. Pat. No. 4,773,436 issued to Cantrell et al., the entire disclosure of which is incorporated herein by reference. The machine of Cantrell includes a wash tank with multiple jets evenly spaced apart at an elevated position along the rear wall of the wash tank. The tank is filled with water (wash fluid) to a level above the position of the jets. Pots and pans are placed in the wash tank, and a pump is activated to draw fluid from within the wash tank and direct it through the jets to create a jet stream. Each jet directs its jet stream toward the bottom wall of the wash tank, the bottom wall then deflects the jet stream upward and towards the front wall of the tank. The front wall then deflects the upward moving jet stream towards the rear wall of the tank, and the rear wall deflects the jet stream downward and back towards the front wall along the bottom wall. The combination of deflections of the jet stream from the bottom, front and rear walls provides a rolling washing action within the wash tank.

The basic components of the wash tank of an exemplary pot and pan washing machine of the prior art are shown in FIG. 1. Wash tank 10 includes end walls 12 and 14, rear side wall 16, front side wall 18 and bottom wall 19. A pump can be attached to either end wall; in the embodiment shown in FIG. 1, pump 50 is attached to right end wall 14. An impeller located within pump 50 is driven by electric motor 56. In the embodiment shown in FIG. 1, the impeller draws fluid into pump inlet 52 through an intake port (not shown) located in end wall 14. The fluid is then discharged from the pump through pump outlet 54 and into outlet manifold 60. Outlet manifold 60 includes a ninety degree turn, and several other turns, to direct the fluid across the back side of rear wall 16 and out jet nozzles 20 which are protruding through and extending from rear wall 16. The intake port associated with pump inlet 52 is covered by perforated (holes, voids, mesh, etc.) intake manifold 30. Intake manifold 30 includes handle 36 and is removably supported within wash tank 10 for easy cleaning. Intake manifold 30 fits tightly between outer runner 32 and inner runner 34, each of which extends vertically from bottom wall 19. Heating element 40 is positioned between intake manifold 30 and end wall 14 for its protection and to maximize the use of space.

Although the prior art pot and pan washing machine disclosed in U.S. Pat. No. 4,773,436 provides an exceptional wash action, many of the components discussed above hinder the overall efficiency and performance of the machine. The inventions disclosed in U.S. application Ser. Nos. 09/947,484, 09/947,485, and 10/744,666, the entire disclosures of which are incorporated herein by reference, provide components that greatly increase the overall efficiency and performance of the machine, including improvements to the intake and discharge manifolds, jets, pump and system assembly methods. Additionally, the inventions disclosed in U.S. application Ser. No. 12/842,984, the entire disclosure of which is incorporated herein by reference, provides components and methods for washing produce. Nevertheless, prior to the advent of the instant invention, access for cleaning the discharge manifold of the washing machine was limited. Thus, it would be beneficial to provide a device for, and method of, providing easy access for cleaning the discharge manifold of a pot and pan washing machine and/or a produce washing machine. Additionally, it would be beneficial for the device to create an effective seal between the discharge manifold and the wash tank of the washing machine when the discharge manifold is pressurized.

Pots and pans are typically washed using a hot cleaning solution, such as hot water and a relatively strong detergent. Consequently, as the hot cleaning solution circulates through the pot and pan washing machine, the machine itself is being cleaned and sanitized. Furthermore, debris, such as food particles, is typically scraped off of pots and pans prior to placing the pots and pans into the washing machine so as to reduce the chances that debris will migrate past the intake manifold and/or otherwise become trapped within concealed areas of the washing machine, such as an interior area of a discharge manifold. Furthermore still, the hot cleaning solution sterilizes and helps to break-down much of the debris that becomes trapped within such concealed areas of the washing machine. Regardless, it would be beneficial for a pot and pan washing machine to include a device for, and method of, providing easy access for cleaning concealed and/or otherwise inaccessible areas of the washing machine.

Produce is typically washed using a cold solution, such as cold water. The cold solution may or may not include a relatively weak detergent. Consequently, the circulation of cold solution through the produce washing machine does not necessarily clean or sanitize the washing machine. Furthermore, particles of produce and other debris are often removed from the produce (intentionally or unintentionally) during the washing process. Some of this debris becomes trapped within concealed areas of the washing machine. Furthermore still, the cold solution does not necessarily sterilize or break-down the debris that becomes trapped within such concealed areas of the washing machine. Thus, it would be beneficial for a produce washing machine to include a device for, and a method of, providing easy access for cleaning concealed and/or otherwise inaccessible areas of the washing machine.

Furthermore, accessories, such as produce cutters, are often mounted on washing machines. Such accessories can hold water and/or debris, such as food particles, and/or can trap water and/or debris between the accessory and the washing machine. Thus, it would be beneficial for a washing machine accessory to be removable from a washing machine so that the accessory and the washing machine can be more easily cleaned.

Furthermore still, referring to FIG. 6A, washing machines often include intake 153 and/or discharge 155 guard rods to prevent users from extending tools and/or appendages into a pump of the washing machine through respective pump inlets 152 and/or pump outlets 154, thereby avoiding damage to the pump and/or harm to the user. Washing machines also include intake screens 120 that further restrict access to the pump inlets 152. Thus, it would be beneficial for a washing machine to include a purging system to purge debris from the pump while maintaining the safety features of the pump.

SUMMARY OF THE INVENTION

The instant invention provides a removable jet channel that is capable of providing easier access for cleaning a discharge manifold of continuous motion wash tank style machines such as the washing machines described in any of U.S. Pat. No. 4,773,436, or U.S. application Ser. Nos. 09/947,484, 09/947,485, 10/744,666, 12/430,724, 12/765,838, 12/842,984 (the entire disclosures of which are incorporated herein by reference). It will be appreciated that other washing machines, or various combinations of washing machine components, may be utilized without departing from the spirit and scope of the instant invention.

The instant invention also provides a purging system and a method of purging debris, such as food particles, from concealed areas of a washing machine. The instant invention still further provides an accessory that is removably coupled to a washing machine so as to provide ease of use of the accessory and ease of cleaning the accessory and the washing machine.

The removable jet channel of the instant invention includes a plurality of discharge jets and is selectively mounted along a rear wall within the wash tank of a continuous motion washing machine, such as any of those described above. In a preferred embodiment, the continuous motion washing machine also includes an intake along the rear wall of the wash tank. In another preferred embodiment, the washing machine includes a pair of partitioning walls (or a single partitioning wall, if located at one of the ends of the wash tank) to subdivide a section of the wash tank.

In one preferred embodiment, the partitioning walls are removably supported within voids created between two adjacent flow guide structures within the wash tank as is further described in U.S. application Ser. No. 12/765,838, filed on Apr. 22, 2010, the entire disclosure of which is incorporated herein by reference. In another embodiment, each partitioning wall is held in position within the wash tank via a pair of removable support brackets that include rails or a slot in which the partition is retained. In yet other embodiments, each portioning wall is held in position by non-removable supports, such as rails or channels welded to the walls of the wash tank.

When coupled to the discharge manifold, the jet channel creates a seal between the wash tank and the discharge manifold such that water forced through the discharge manifold is forced to flow through the discharge jets. In one embodiment the jet channel includes opposed flanges that deflect to create a lip seal function when the jet channel is positioned in the discharge manifold.

One method of cleaning the discharge manifold, based on the present invention, includes removing the jet channel from the discharge manifold so as to gain relatively unencumbered access to the discharge manifold. While the jet channel is removed, the discharge manifold and the jet channel, including the discharge jets, may be easily cleaned. When cleaning is finished, the jet channel may be re-inserted within the discharge manifold to enable further operation of the washing machine.

The purging system includes a selector valve in selective fluid communication with a plurality of purging ports, each purging port being strategically positioned so as to direct a stream of purging fluid into a concealed area of the washing machine. One method of purging a washing machine, based on the present invention, includes forcing purging fluid through one or more purging port so as to direct debris towards the discharge manifold and/or the wash tank of the washing machine. In some methods, a firing sequence is used to force purging fluid through one or more initial purging port in a specific sequence. In some such methods, purging fluid forced through the one or more initial purging port causes debris near the one or more initial purging port to migrate towards the discharge manifold and/or the wash tank. In some embodiments and/or circumstances, the debris also migrates towards one or more other purging port while purging fluid is not being forced through the one or more other purging port. Purging fluid is then forced through the one or more other purging port so as to cause the debris to continue to travel towards the discharge manifold and/or the wash tank. In some embodiments of the present invention, the firing sequence is repeated until all, or a substantial amount of, the debris located in concealed areas of the washing machine migrates into the discharge manifold and/or out into the wash tank of the washing machine.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION OF THE DRAWINGS

A preferred embodiment of the invention, illustrative of the best mode in which the applicant has contemplated applying the principles, is set forth in the following description and is shown in the drawings and is particularly and distinctly pointed out and set forth in the appended claims.

DETAILED DESCRIPTION OF A PREFERRED EMBODIMENT

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
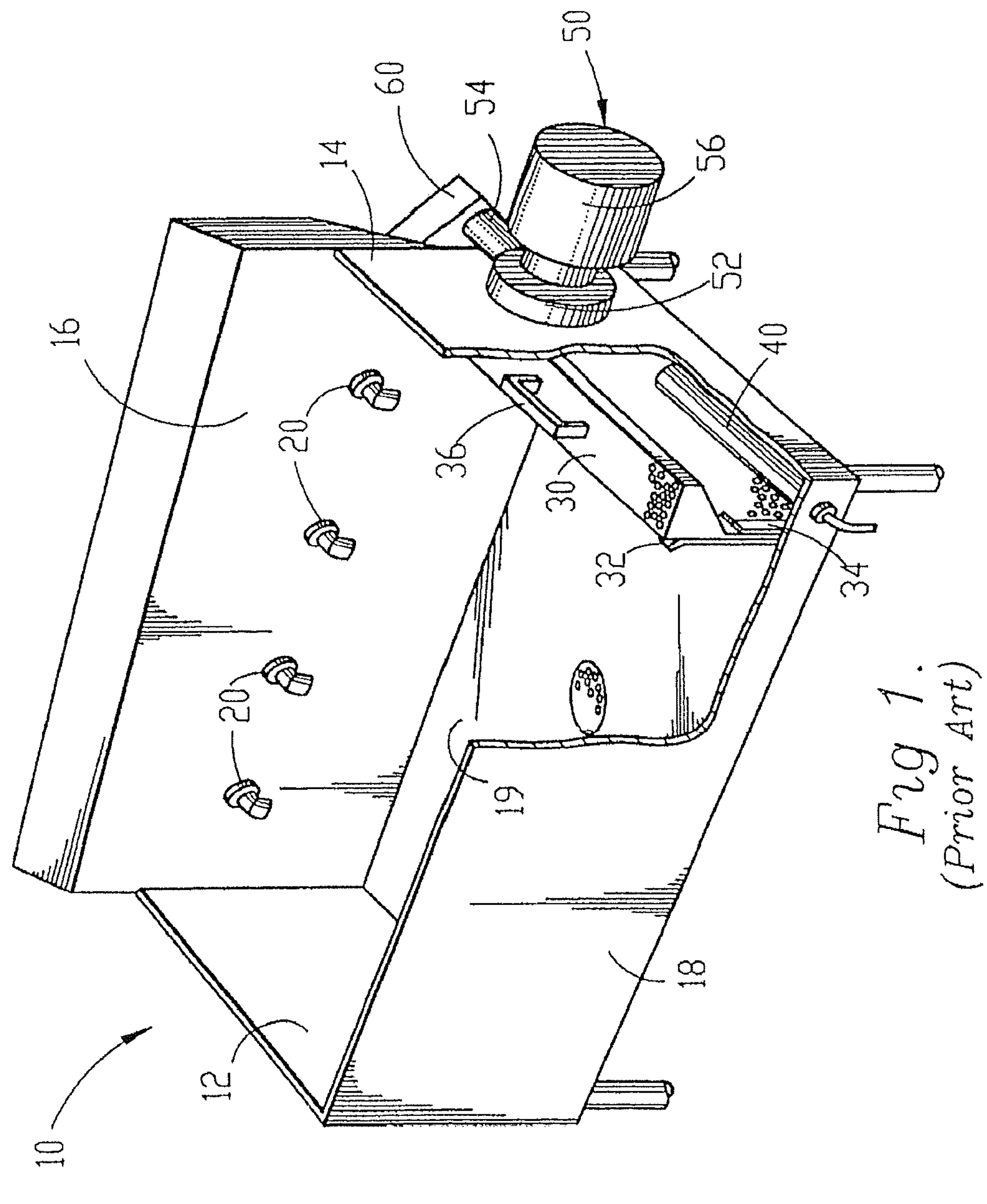
Fig 1. (Prior Art)
FIG. 1 is a partial perspective view of a continuous motion washing machine of the prior art in which embodiments of the instant invention may be incorporated.
Figure 2A:
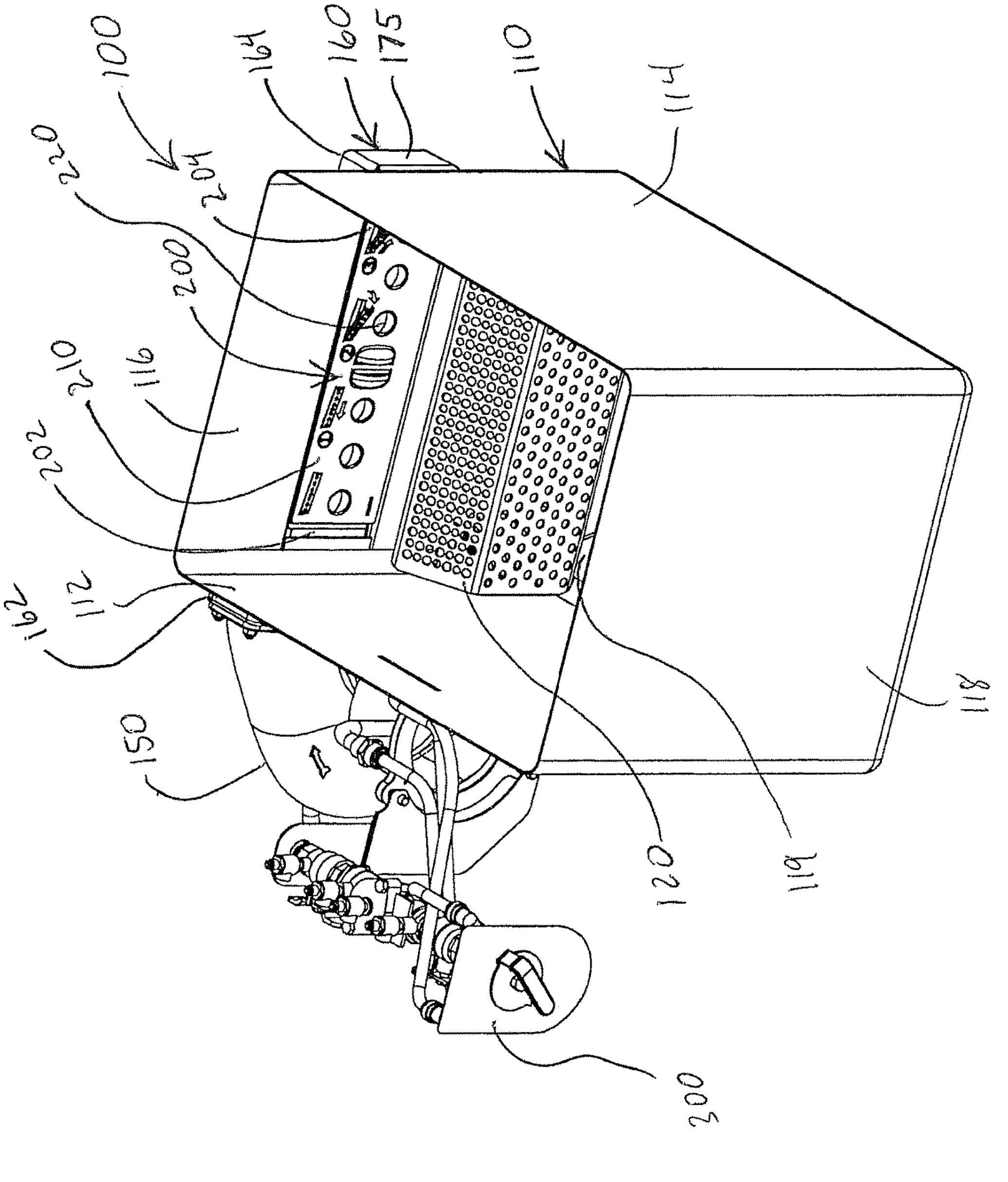
FIG. 2A is a perspective view of a washing machine of the present invention.
Figure 2B:
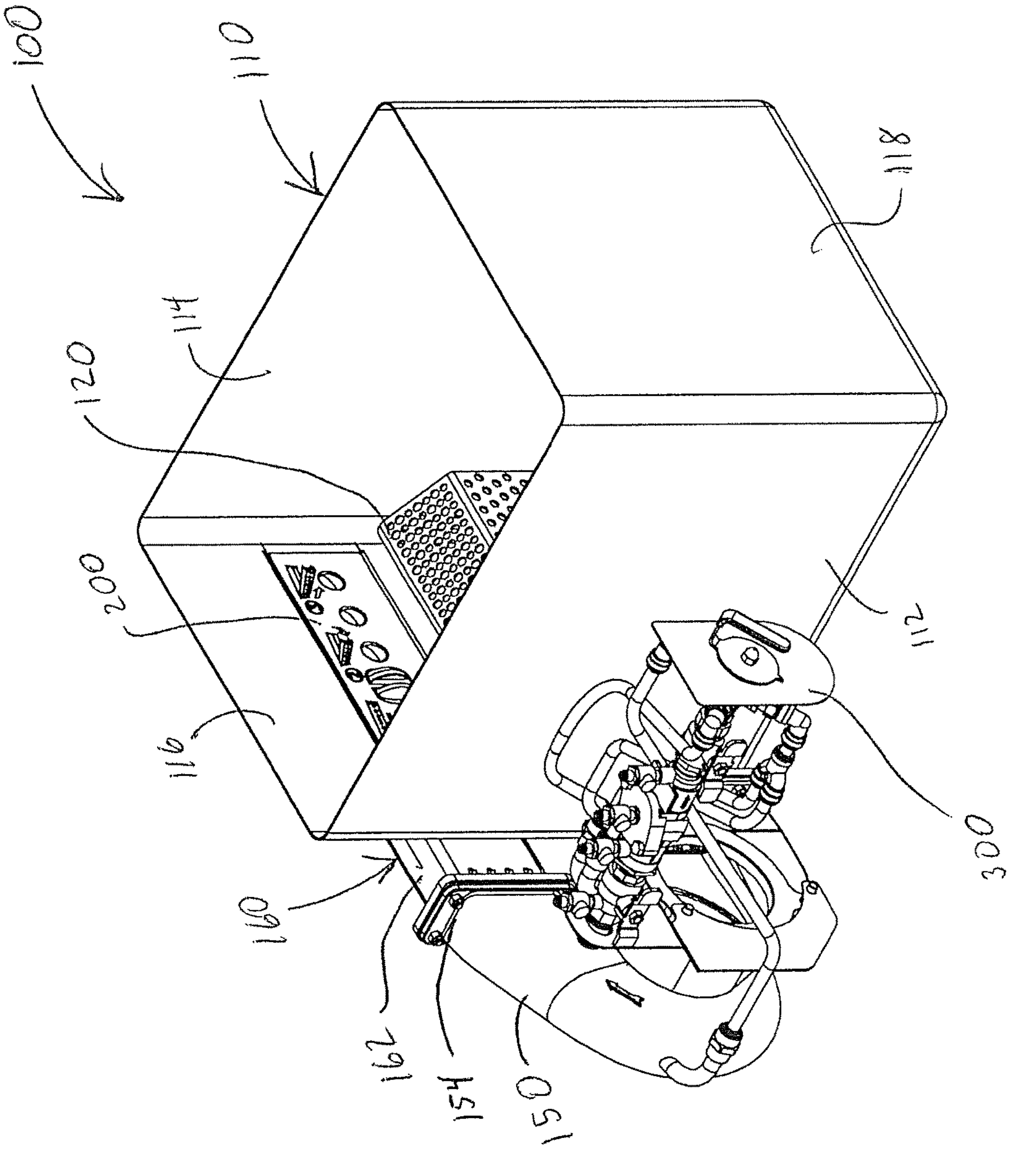
FIG. 2B is a perspective view of the washing machine of FIG. 2A shown at a different angle than FIG. 2A.
Figure 2C:
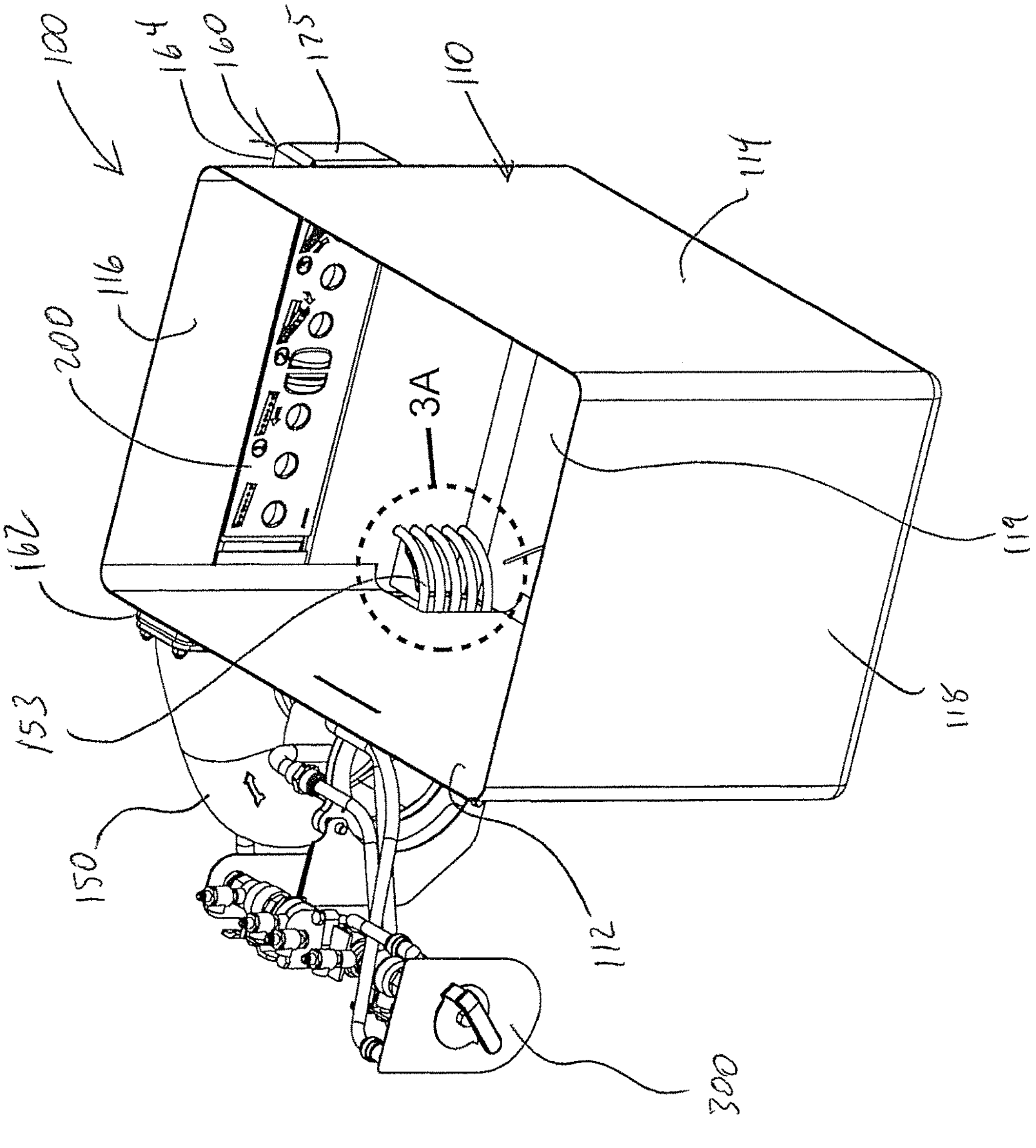
FIG. 2C is a perspective view of the washing machine of FIG. 2A with the intake screen removed so as to reveal intake guards.
Figure 3B:
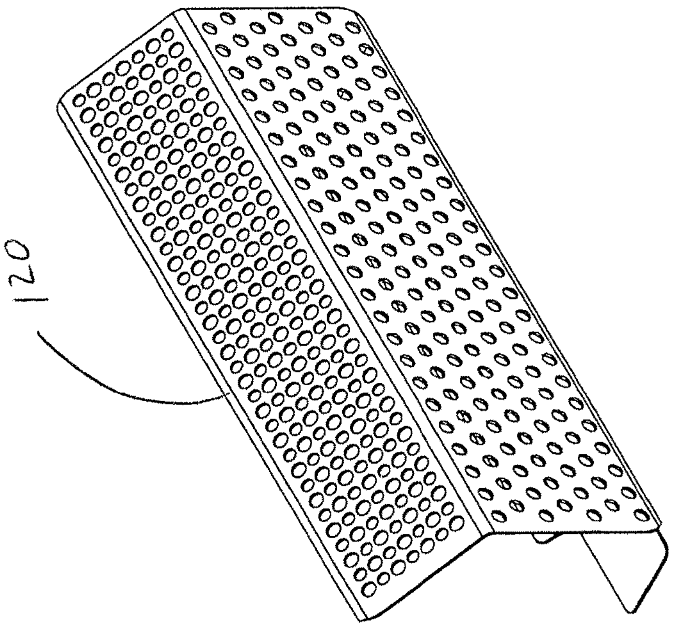
FIG. 3B is a perspective view of an intake screen that is removed from the washing machine.
Figure 3A:
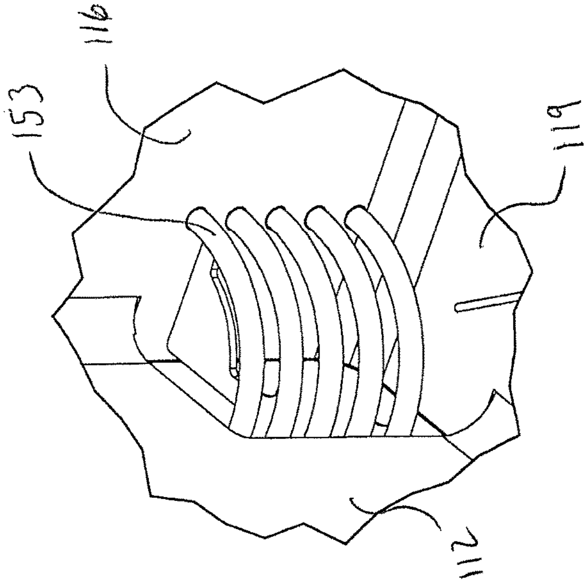
FIG. 3A is an isolated view on an enlarged scale of a portion of FIG. 2C.
Figure 3C:
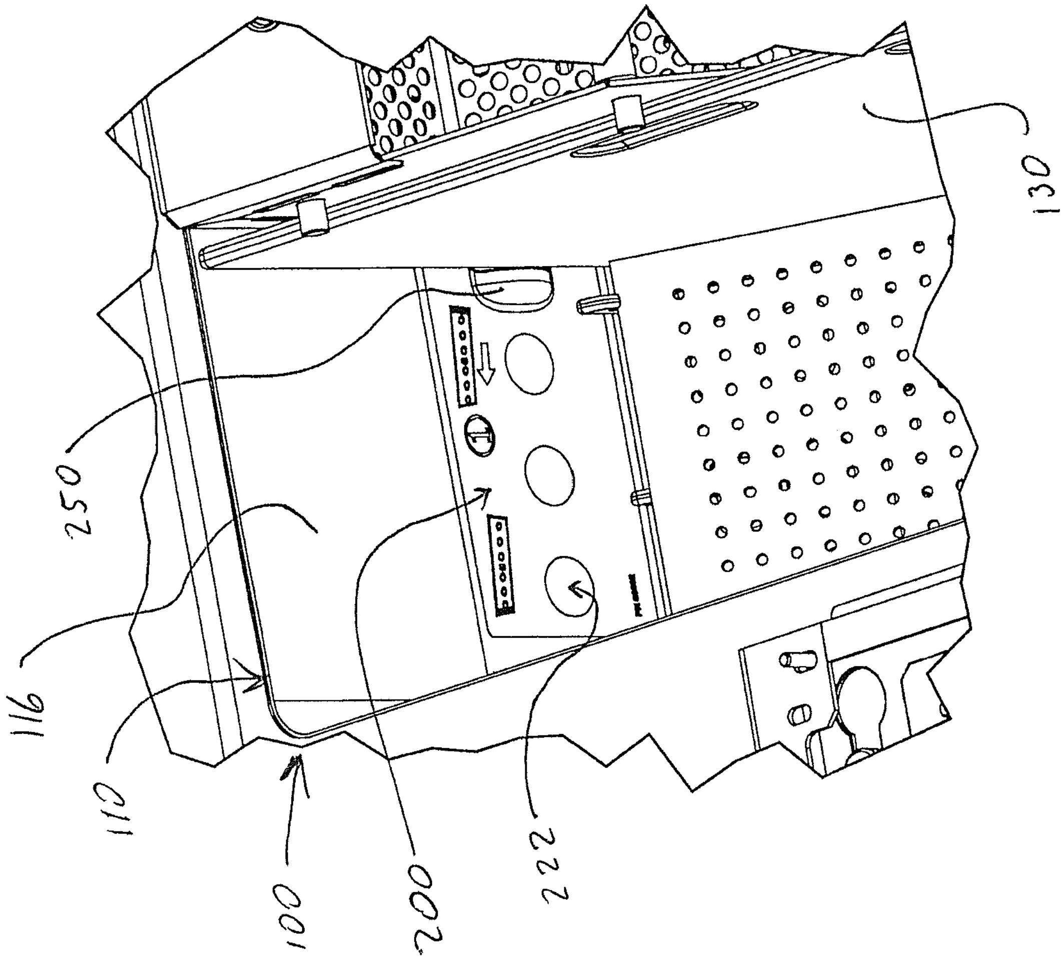
FIG. 3C is a partial perspective view of a washing machine showing a partitioning wall keyed to a partition slot of a jet channel.

Referring to FIGS. 2A and 2B, a preferred embodiment of a washing machine 100 of the present invention is shown. The washing machine 100 includes a wash tank 110 including left 112 and right 114 end walls, front 118 and rear 116 side walls, and a bottom wall 119. The wash tank 110 is configured to selectively hold a volume of washing fluid. A pump 150 is in fluid communication with the volume of washing fluid such that the pump 150 is capable of simultaneously drawing washing fluid from and delivering washing fluid to the wash tank 110 so as to create a washing action within the volume of washing fluid.

Referring to FIGS. 11A-15B, the pump 150 includes a pump inlet 152, a pump outlet 154, and an interior volume 156 extending between the pump inlet 152 and the pump outlet 154. An impeller 158 is positioned within the interior volume 156 of the pump 150. In some such embodiments, the impeller 158 is driven by a power source, such as an electric motor, so as to cause washing fluid to be drawn from the wash tank 110 into the interior volume 156 through the pump inlet 152 and out the interior volume 156 through the pump outlet 154.

Figure 4:
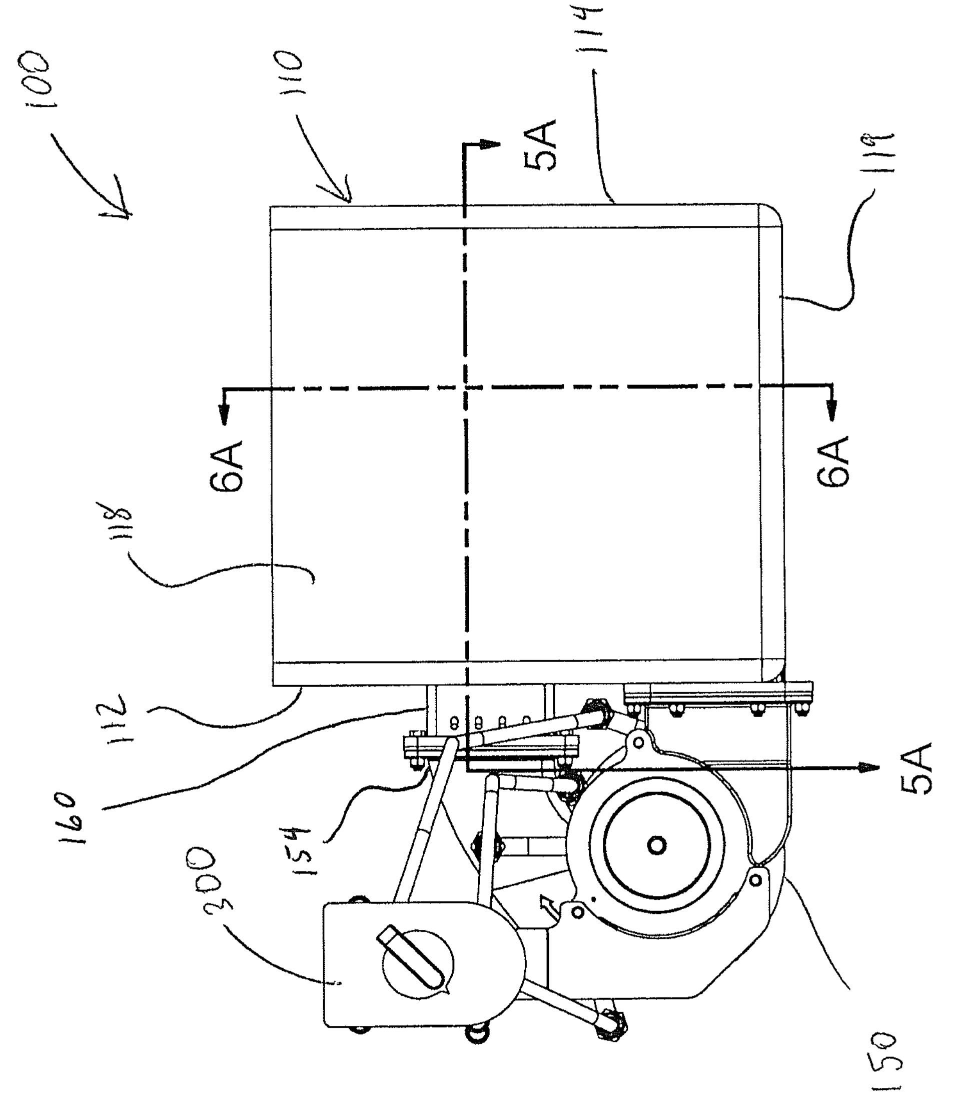
FIG. 4 is a front elevation view of the washing machine of FIG. 2A.
Figure 5A:
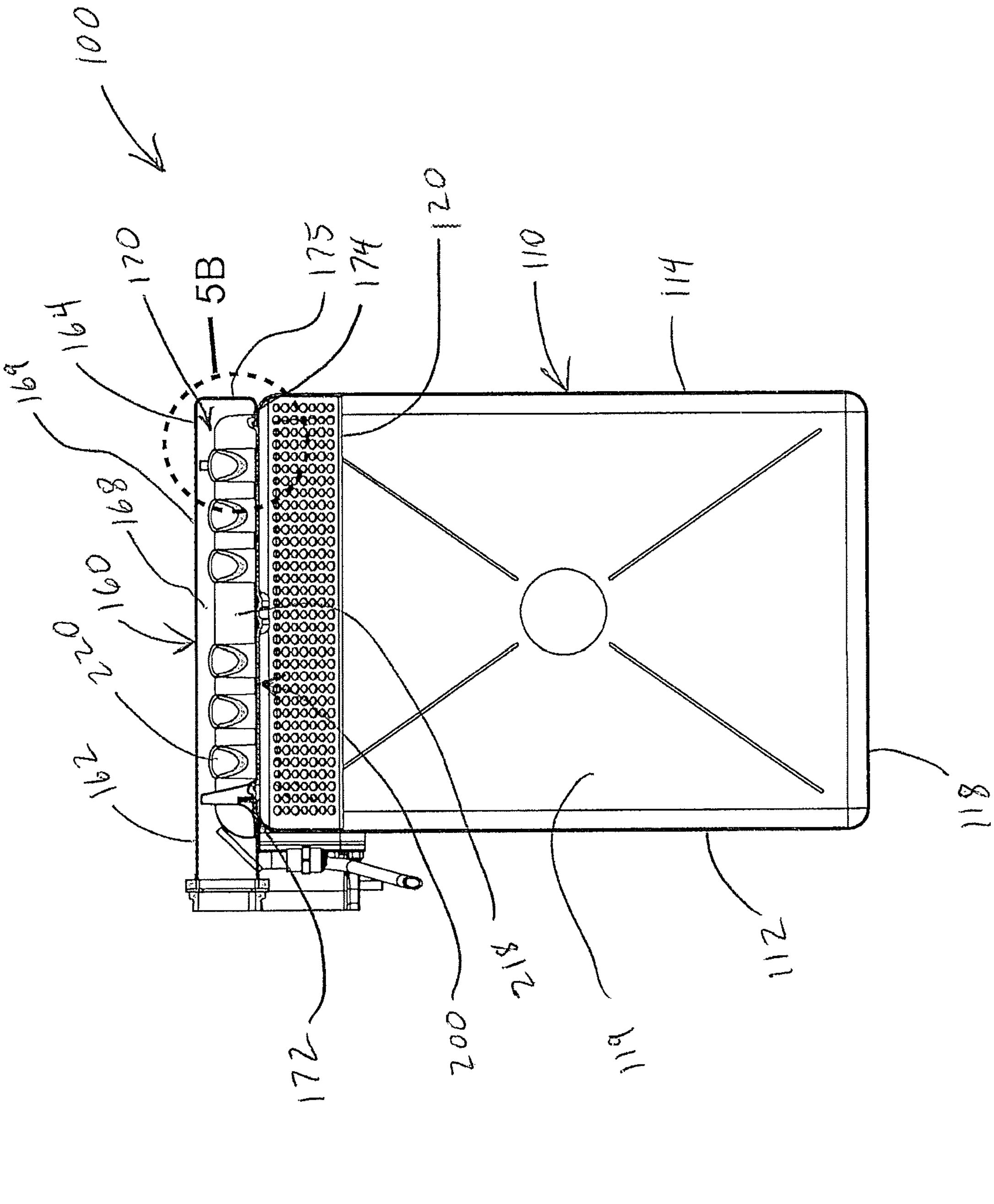
FIG. 5A is a sectional view taken along line 5A-5A of FIG. 4.
Figure 5B:
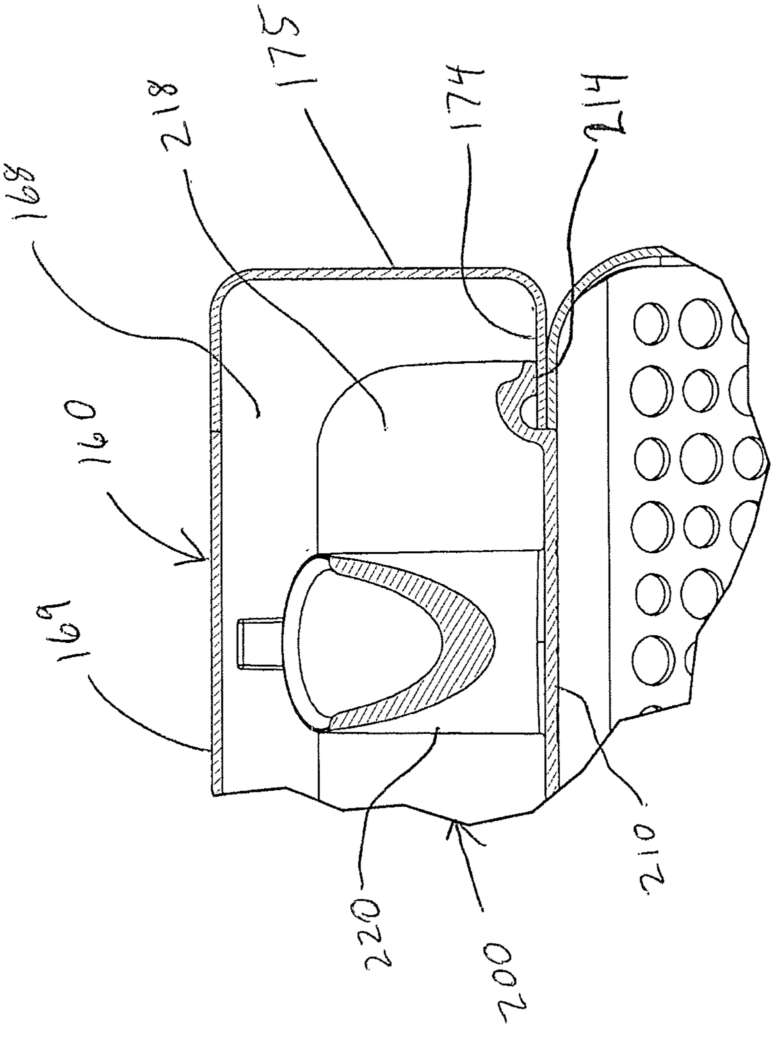
FIG. 5B is an isolated view on an enlarged scale of a portion of FIG. 4.

Referring to FIGS. 2B and 4, fluid from the pump 150 is discharged from the pump 150 through the pump outlet 154 and into a discharge manifold 160. The discharge manifold 160 includes an open proximal end 162 and a closed distal end 164. In some embodiments, a jet channel 200 having jet nozzles 220 is positioned in the discharge manifold 160 such that the discharge manifold 160 and the jet channel 200, together, direct the fluid out the jet nozzles 220 and into the wash tank 110. In a preferred embodiment, the jet channel 200 is removable from the discharge manifold 160 so that the discharge manifold 160 and the jet channel 200 can be cleaned.

Figures 9A, 9B, 9C:
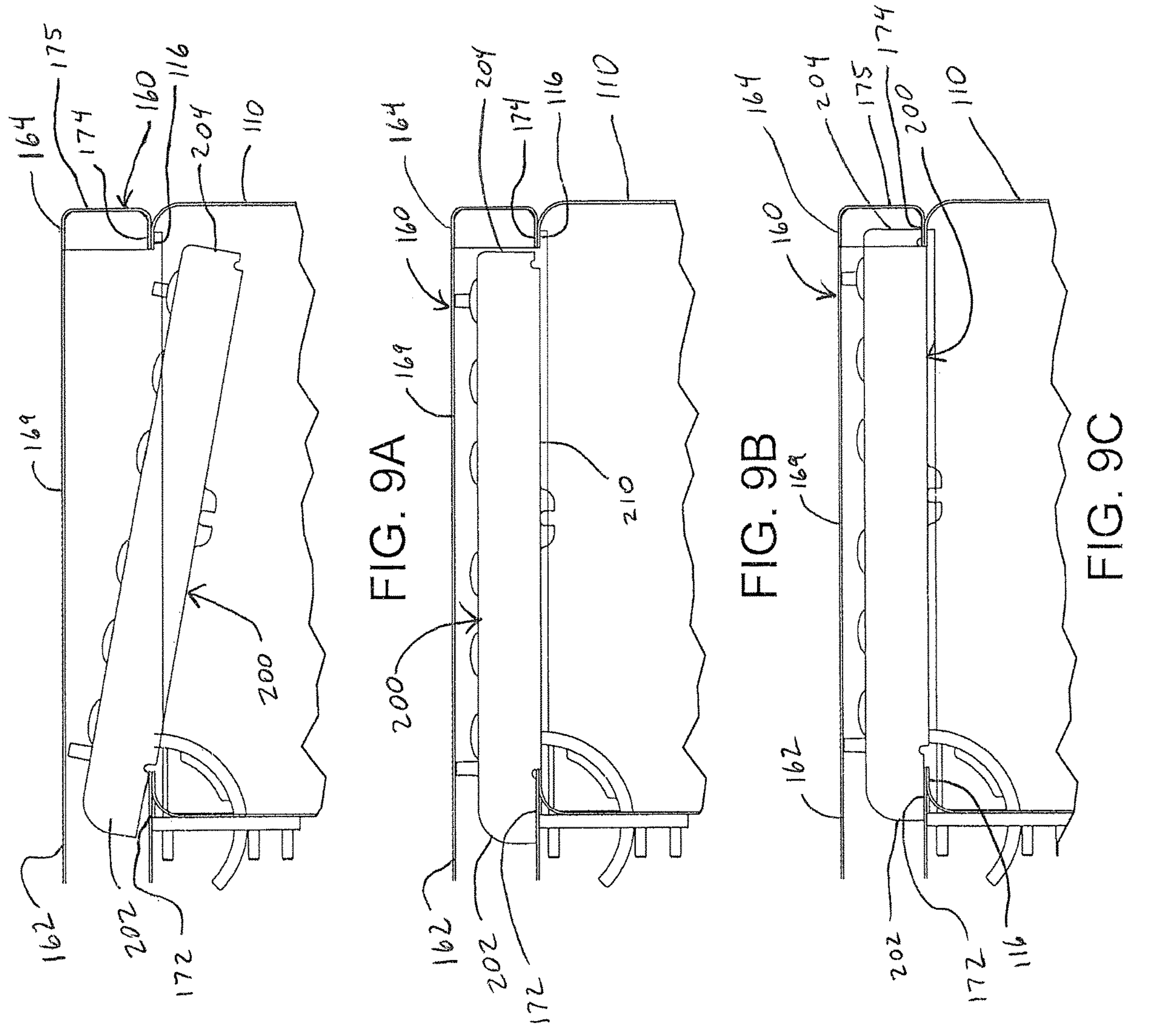
FIG. 9A is a top view of a jet channel being in an rotated configuration.
FIG. 9B is a top view of the jet channel of FIG. 9A with the jet channel being in an unlocked configuration.
FIG. 9C is a top view of the jet channel of FIG. 9A with the jet channel being in a locked configuration.
Figure 10B:
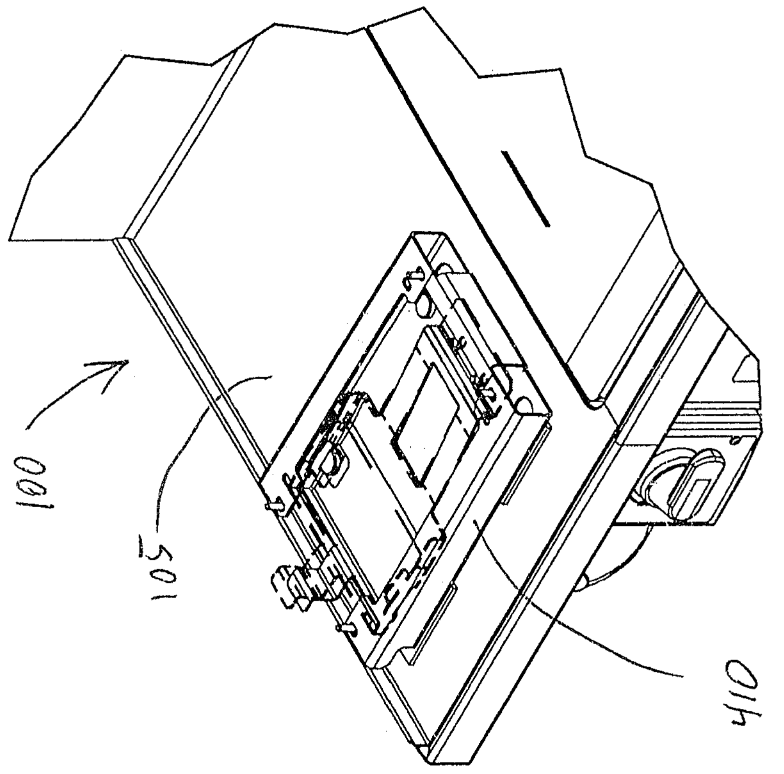
FIG. 10B is a partial perspective view of a cutter mount secured to a washing machine of the present invention.
Figure 10A:
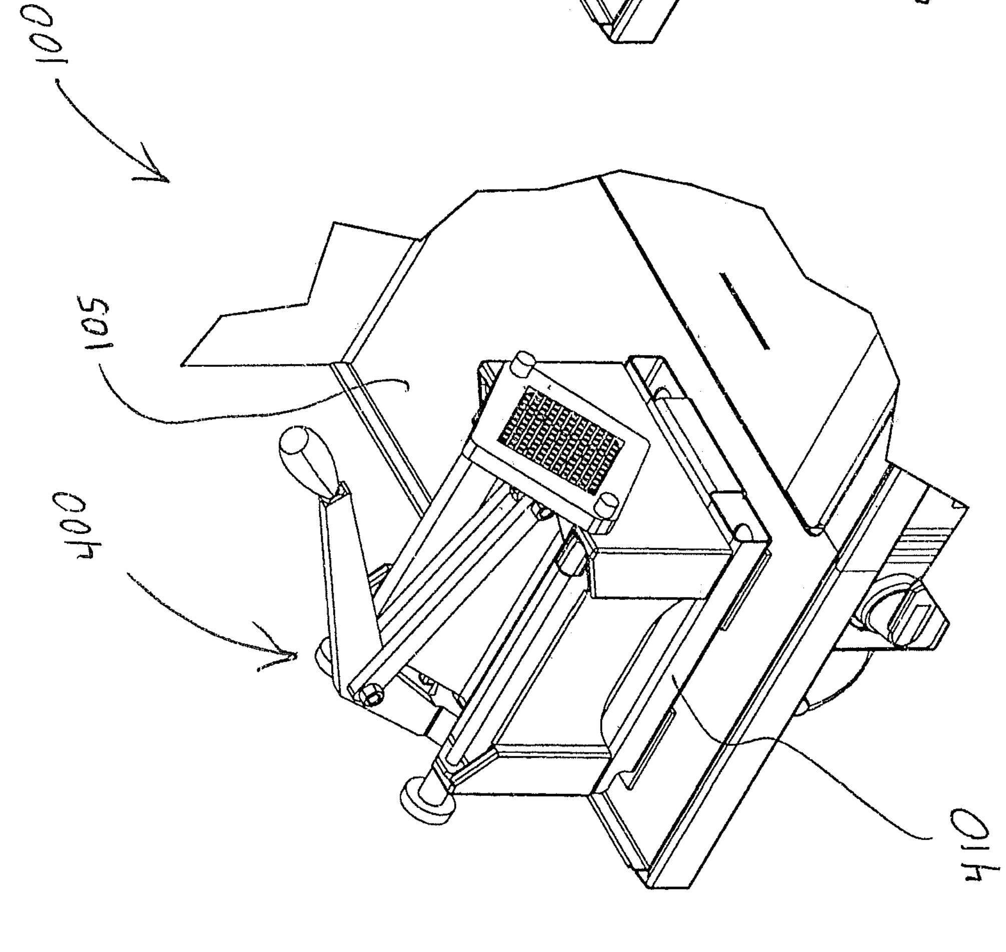
FIG. 10A is a partial perspective view of a produce cutter coupled to a cutter mount and secured to a washing machine of the present invention.
Figure 10D:
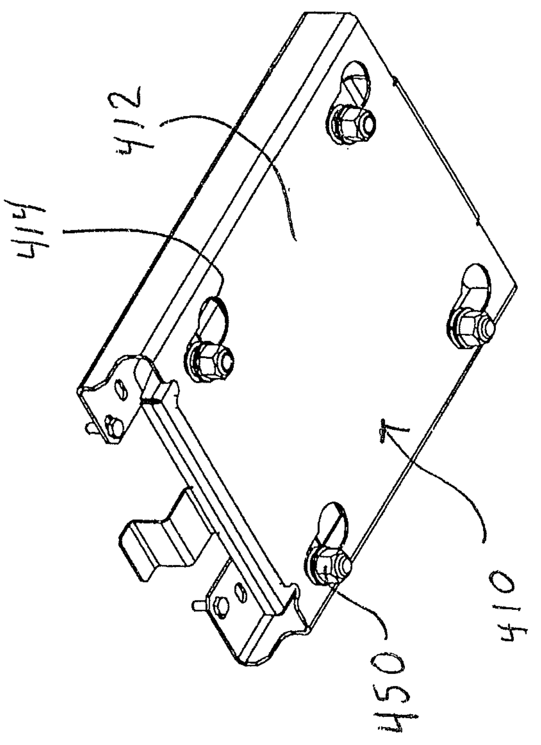
FIG. 10D is a perspective view of the cutter mount of FIG. 10C shown at a different angle than FIG. 10C.
Figure 10C:
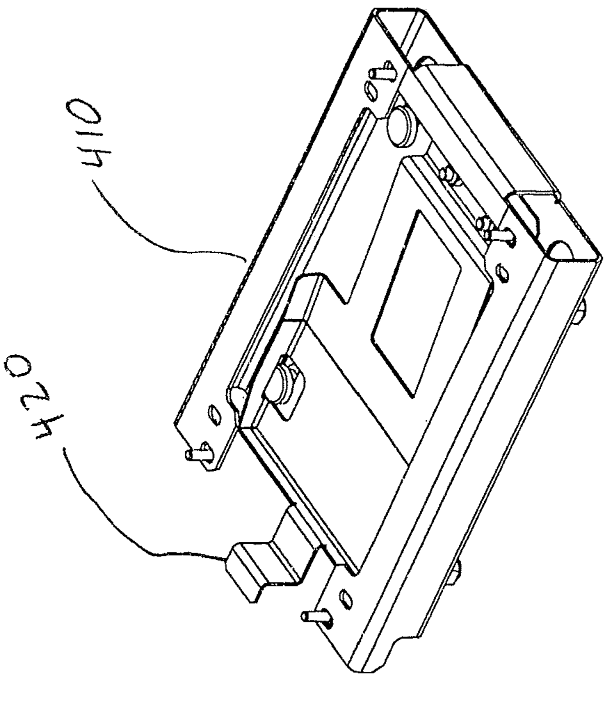
FIG. 10C is a perspective view of a cutter mount.
Figure 11A:
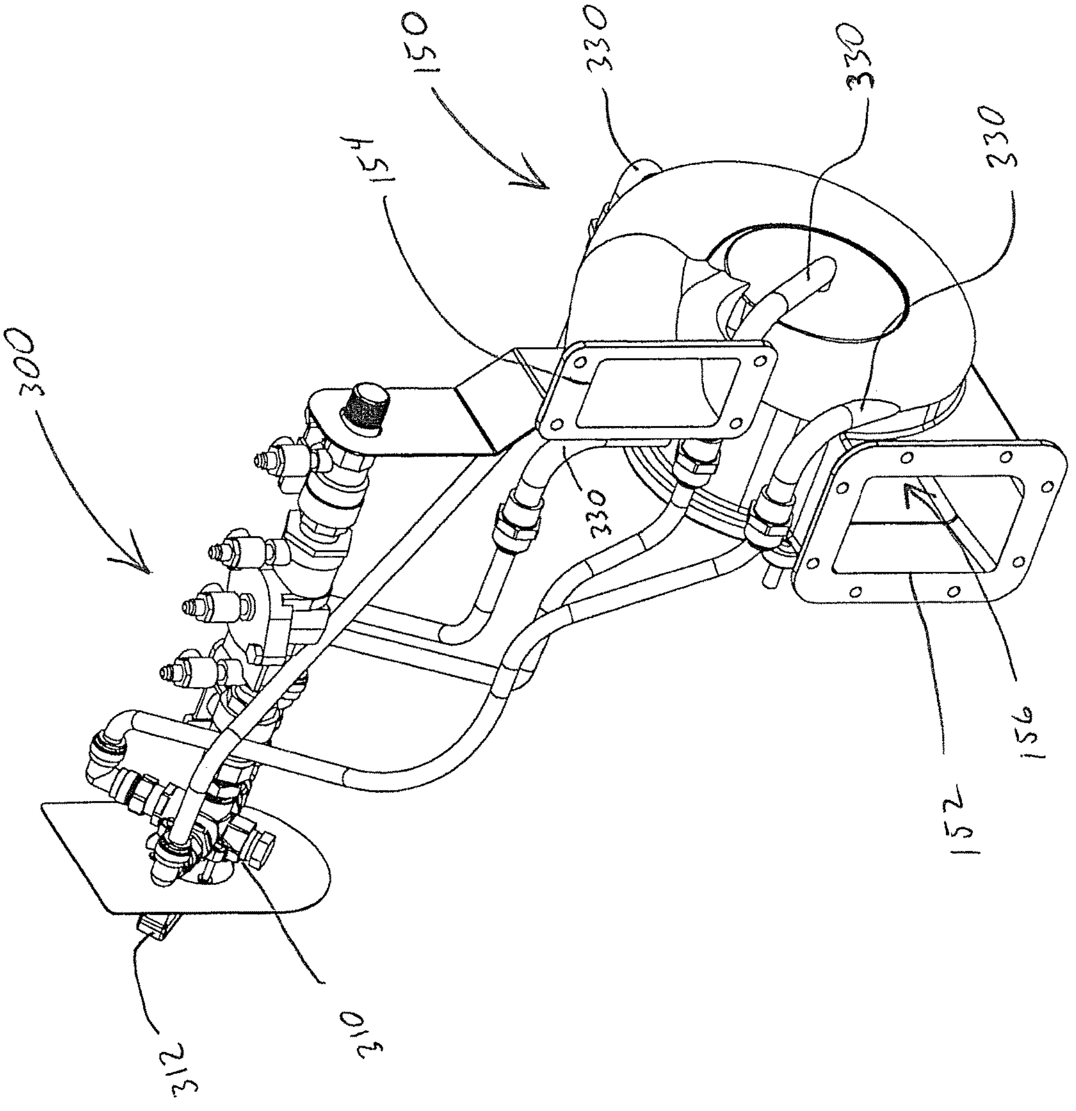
FIG. 11A is a perspective view of a purging system of the present invention.
Figure 11B:
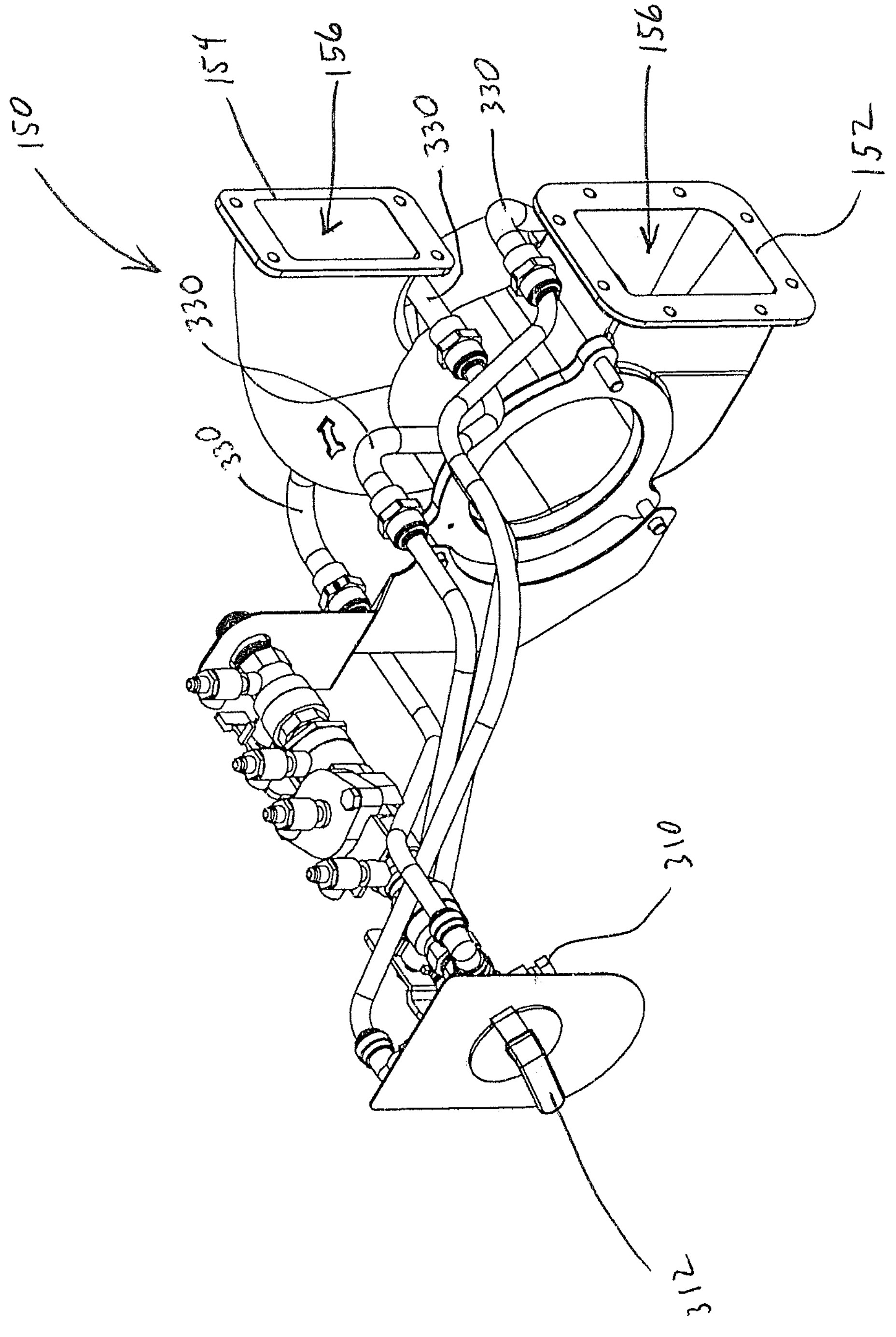
FIG. 11B is a perspective view of the purging system of FIG. 11A shown at a different angle than FIG. 11A.
Figure 11C:
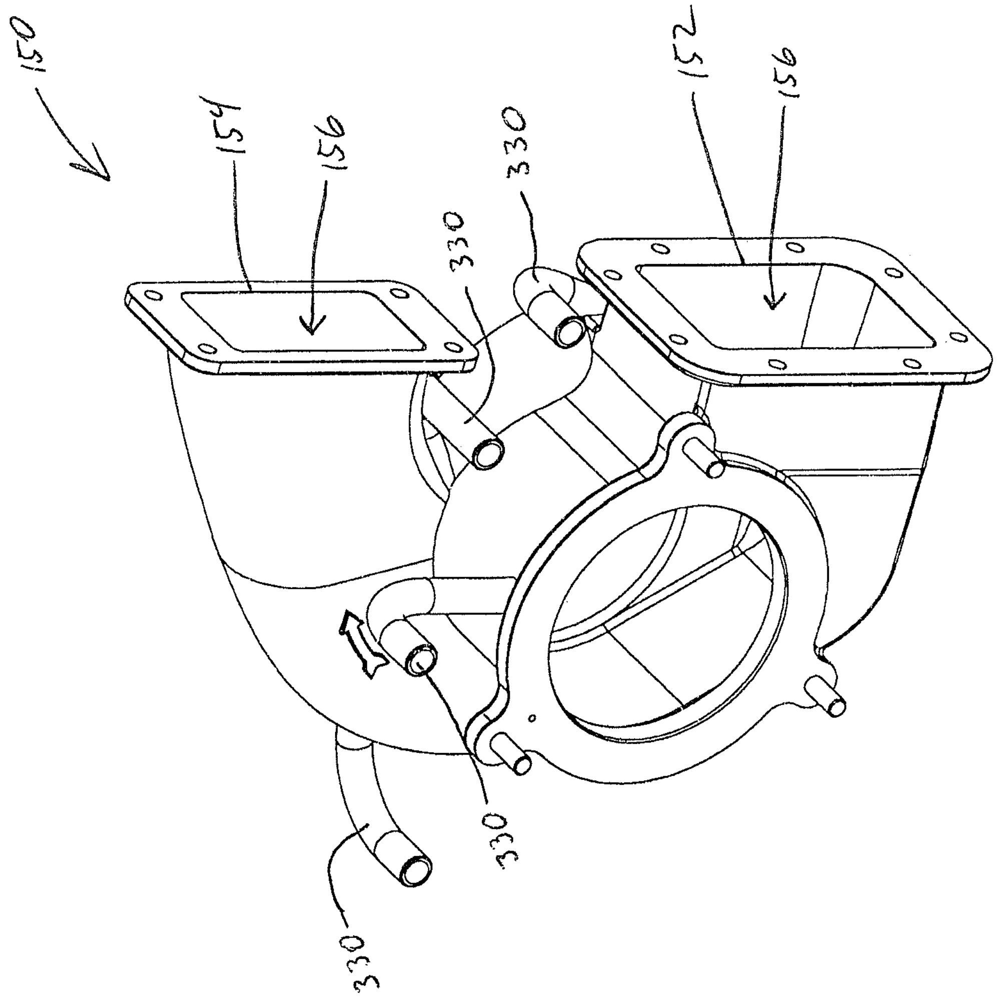
FIG. 11C is a perspective view of a portion of the purging system of FIG. 11A.
Figure 13:
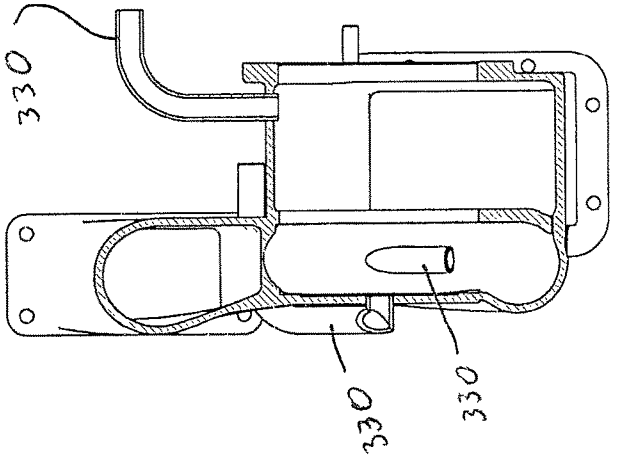
FIG. 13 is a sectional view taken along line 13-13 of FIG. 12.
Figure 12:
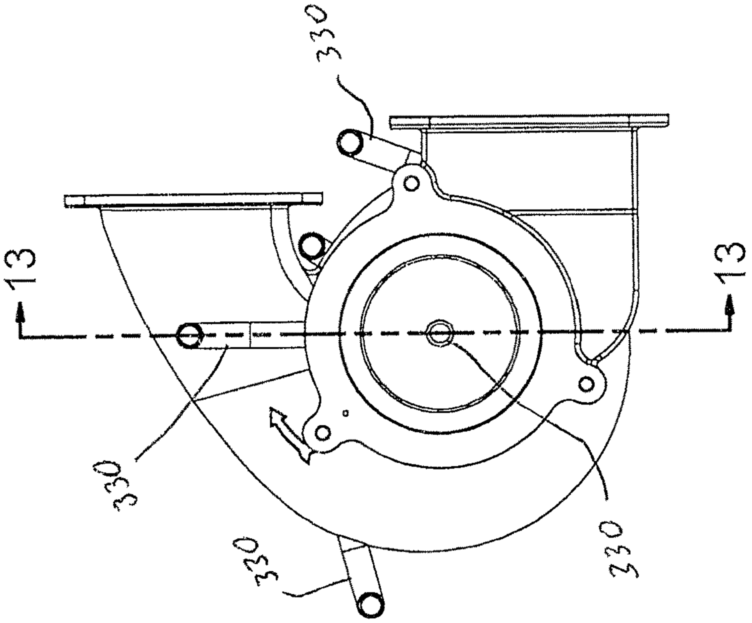
FIG. 12 is a front elevation view of a portion of the purging system of FIG. 11A.
Figure 15A:
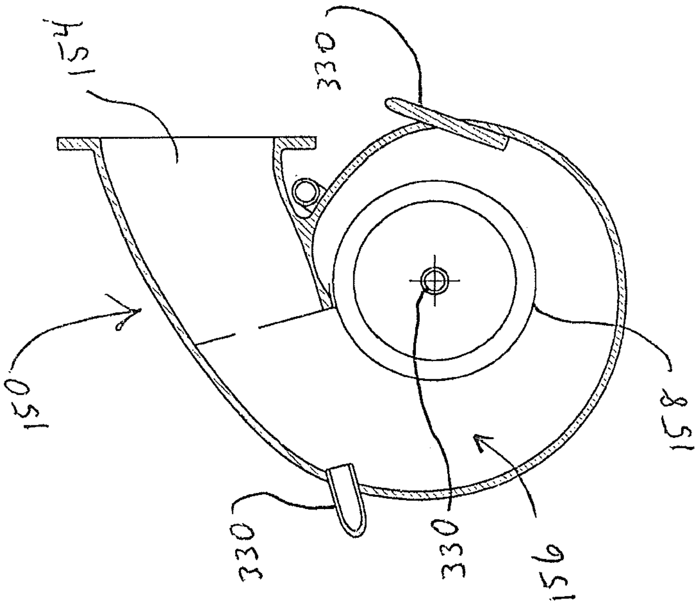
FIG. 15A is a sectional view taken along line 15A-15A of FIG. 14.
Figure 14:
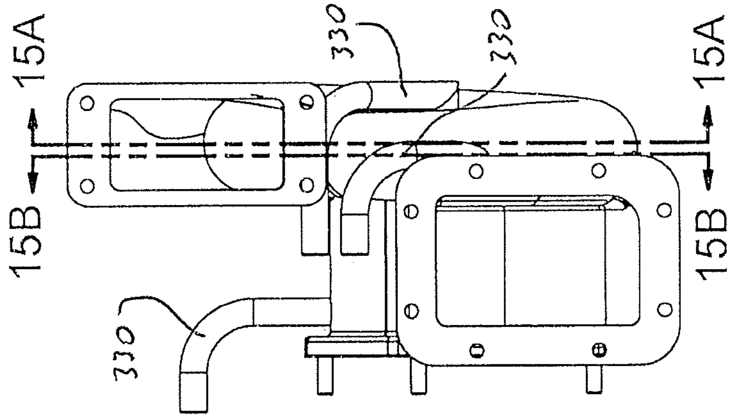
FIG. 14 is a side elevation view of a portion of the purging system of FIG. 11A.
Figure 15B:
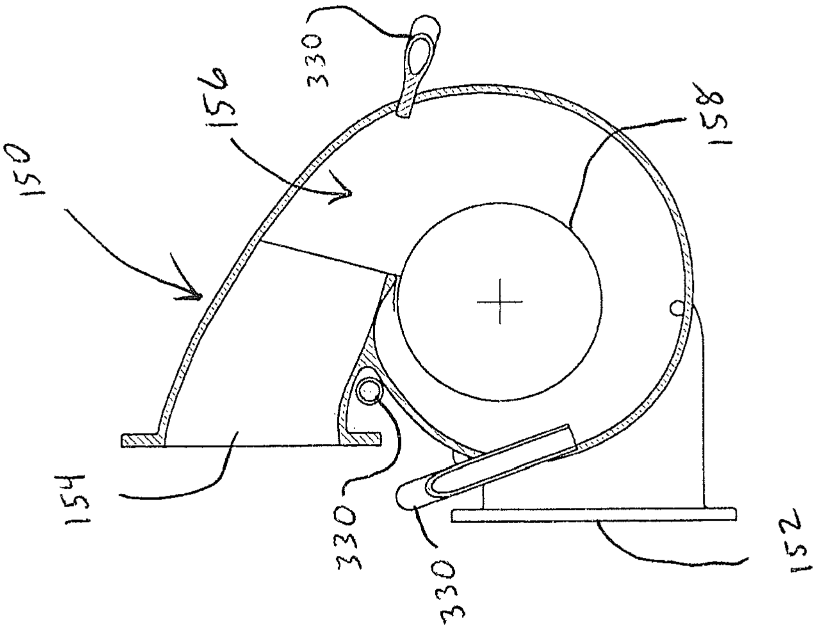
FIG. 15B is a sectional view taken along line 15B-15B of FIG. 14.

FIG. 9C shows a preferred embodiment of the jet channel 200 in a locked configuration. In the locked configuration, proximal 202 and distal 204 ends of the jet channel 200 are positioned relatively adjacent to respective proximal 162 and distal 164 ends of the discharge manifold 160. In some such embodiments, the jet channel 200 engages with the discharge manifold 160 at or near the proximal 202 and distal 204 ends of the jet channel 200 such that the proximal 202 and distal 204 ends of the jet channel 200 are prevented from rotating away from respective proximal 162 and distal 164 ends of the discharge manifold 160. It will be appreciated that other embodiments, not shown, utilize one or more locking feature in addition to, or instead of, engagement with the discharge manifold 160 to prevent the proximal 202 and distal 204 ends of the jet channel 200 from rotating away from respective proximal 162 and distal 164 ends of the discharge manifold 160.

FIG. 9B shows a preferred embodiment of the jet channel 200 in an unlocked configuration. In the unlocked configuration, the distal end 204 of the jet channel 200 is free to rotate away from the distal end 164 of the discharge manifold 160. In some embodiments, the jet channel 200 is moved from the locked configuration to the unlocked configuration by sliding the jet channel 200 laterally away from the distal end 164 of the discharge manifold 160 until the distal end 204 of the jet channel 200 is free to rotate away from the distal end 164 of the discharge manifold 160. It will be appreciated that in other embodiments, not shown, the jet channel 200 is moved from the locked configuration to the unlocked configuration by releasing one or more locking feature in addition to, or instead of, sliding the jet channel 200. Consequently, in some such embodiments, moving the jet channel 200 from the locked configuration to the unlocked configuration does not require the jet channel 200 to be moved at all.

FIG. 9A shows a preferred embodiment of the jet channel 200 in an rotated configuration. In the rotated configuration, a proximal end 202 of the jet channel 200 is positioned relatively adjacent to a proximal end 162 of the discharge manifold 160 and the distal end 204 of the jet channel 200 is rotated away from the distal end 164 of the discharge manifold 160 such that the jet channel 200 can be selectively rotated towards the unlocked configuration or translated laterally until the jet channel 200 is completely removed from the discharge manifold 160 so that the discharge manifold 160 can be cleaned. It will be appreciated that in other embodiments, not shown, the jet channel 200 is capable of being removed from and/or installed in the discharge manifold 160 without requiring the jet channel 200 to be moved to the rotated position.

Referring to FIGS. 7A-8E, a preferred embodiment of the jet channel 200 includes a vertical front panel 210 with top 216 and bottom 218 flanges extending aft from opposed top and bottom edges of the front panel 210. In some embodiments, the front panel 210 and the top 216 and bottom 218 flanges, together, form a C-beam with an open channel. In some such embodiments, the front panel 210 is relatively flat and the top 216 and bottom 218 flanges each extend relatively perpendicularly from the front panel 210 such that the top 216 and bottom 218 flanges are relatively parallel with each other.

Figure 6A:
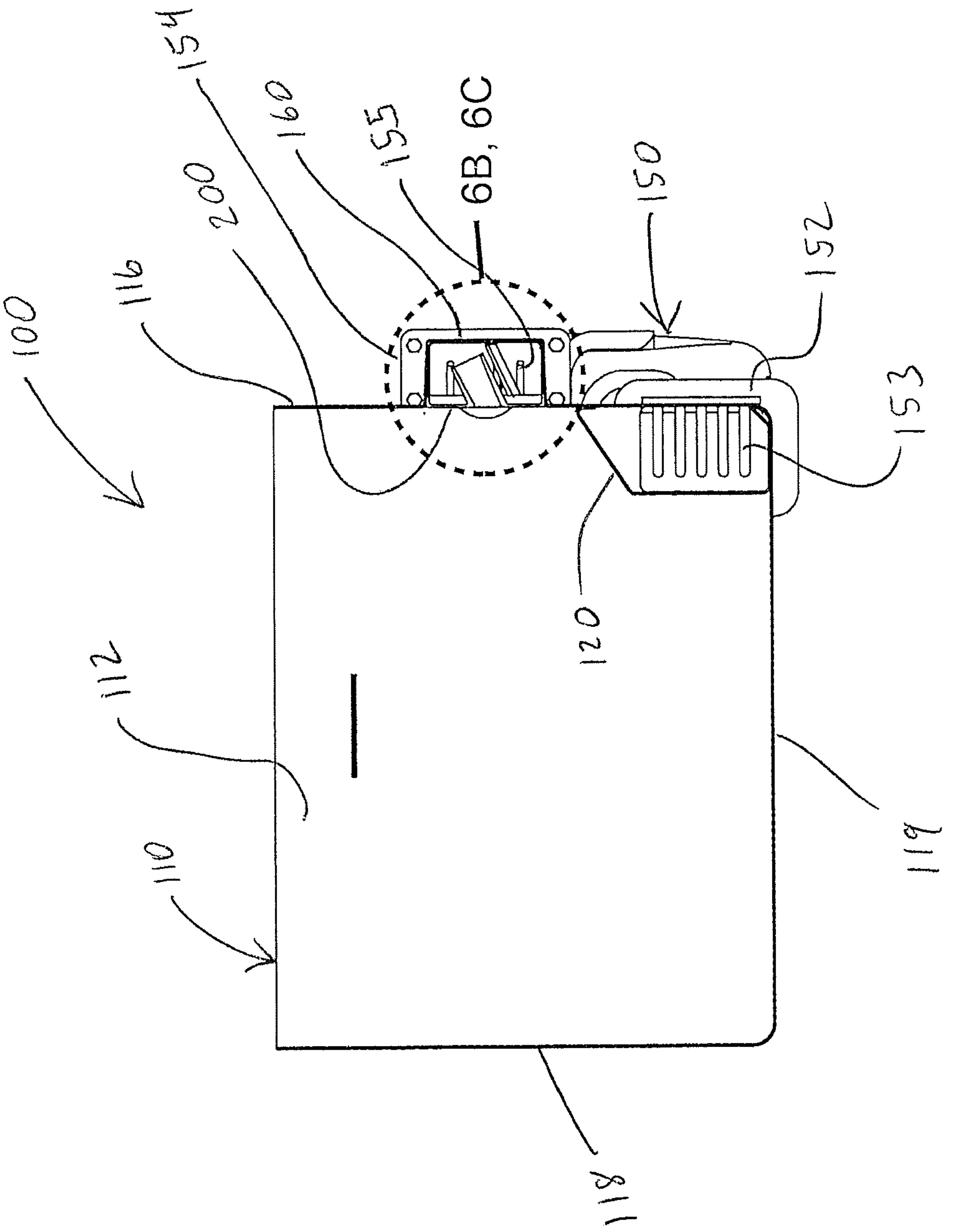
FIG. 6A is a sectional view taken along line 6A-6A of FIG. 4.
Figure 6C:
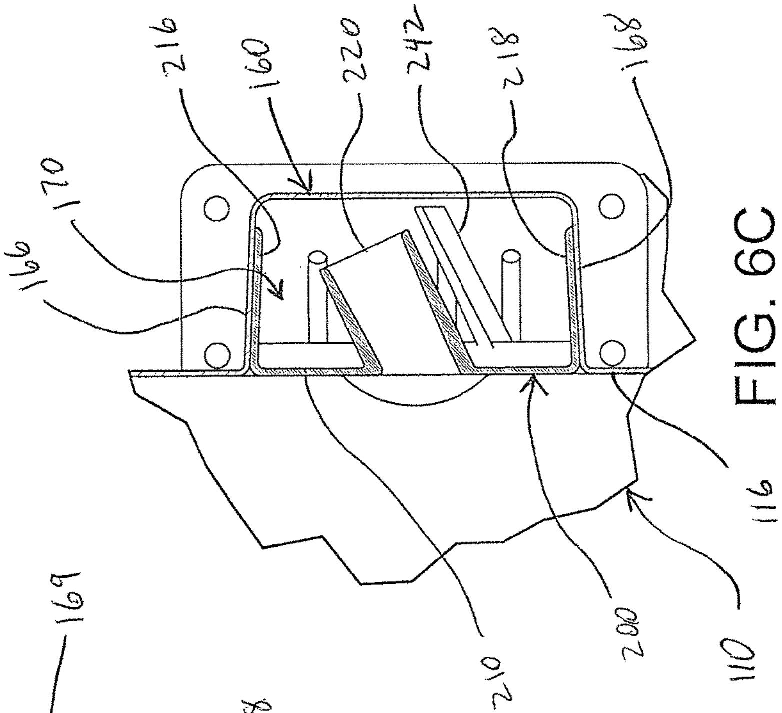
FIG. 6C is an isolated view on an enlarged scale of a portion of FIG. 6A showing a jet channel that is installed in a discharge manifold.
Figure 6B:
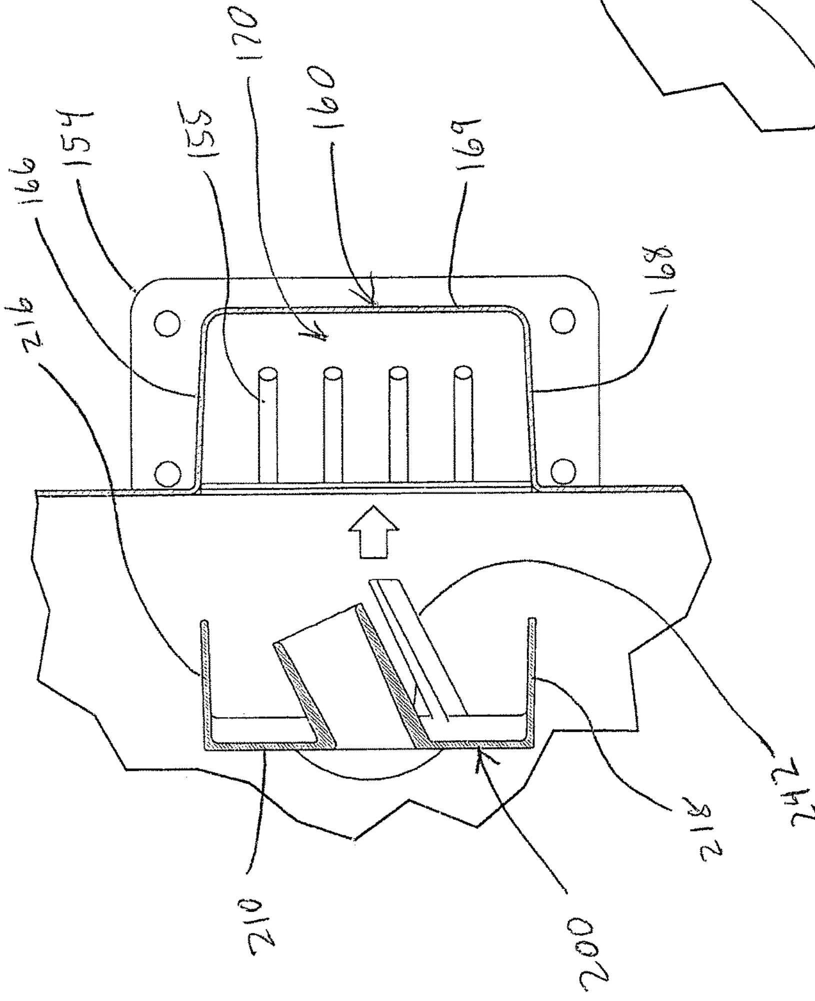
FIG. 6B is an isolated view on an enlarged scale of a portion of FIG. 6A showing a jet channel that is removed from a discharge manifold.
Figure 7A:
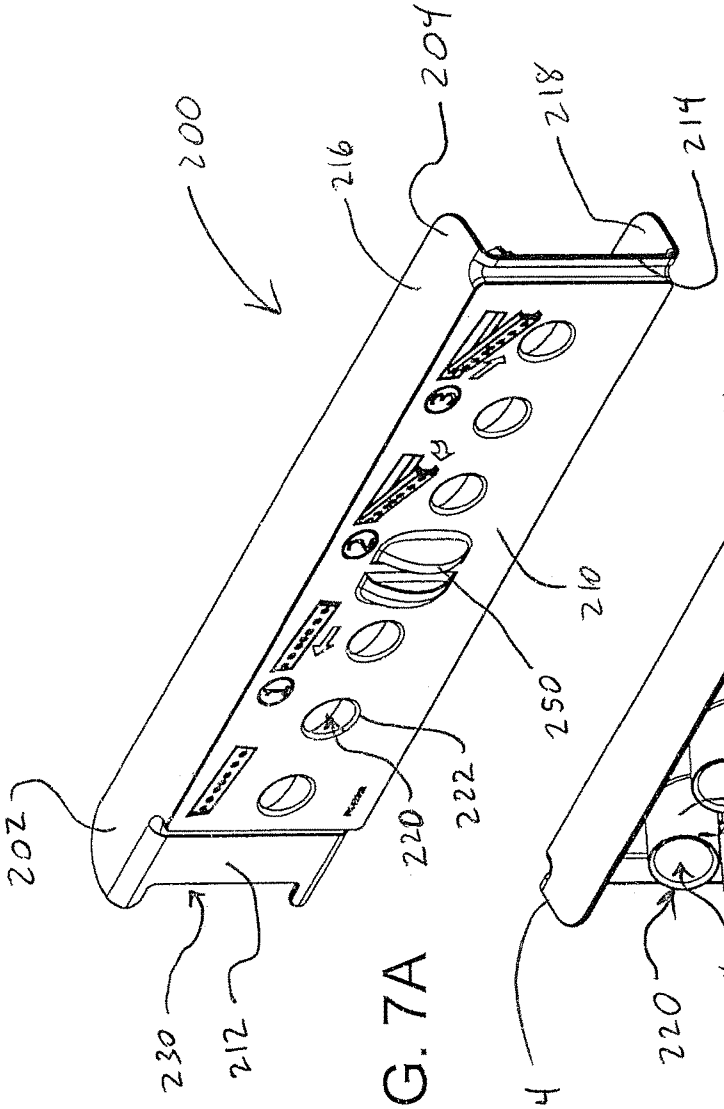
FIG. 7A is a perspective view of a jet channel.
Figure 7B:
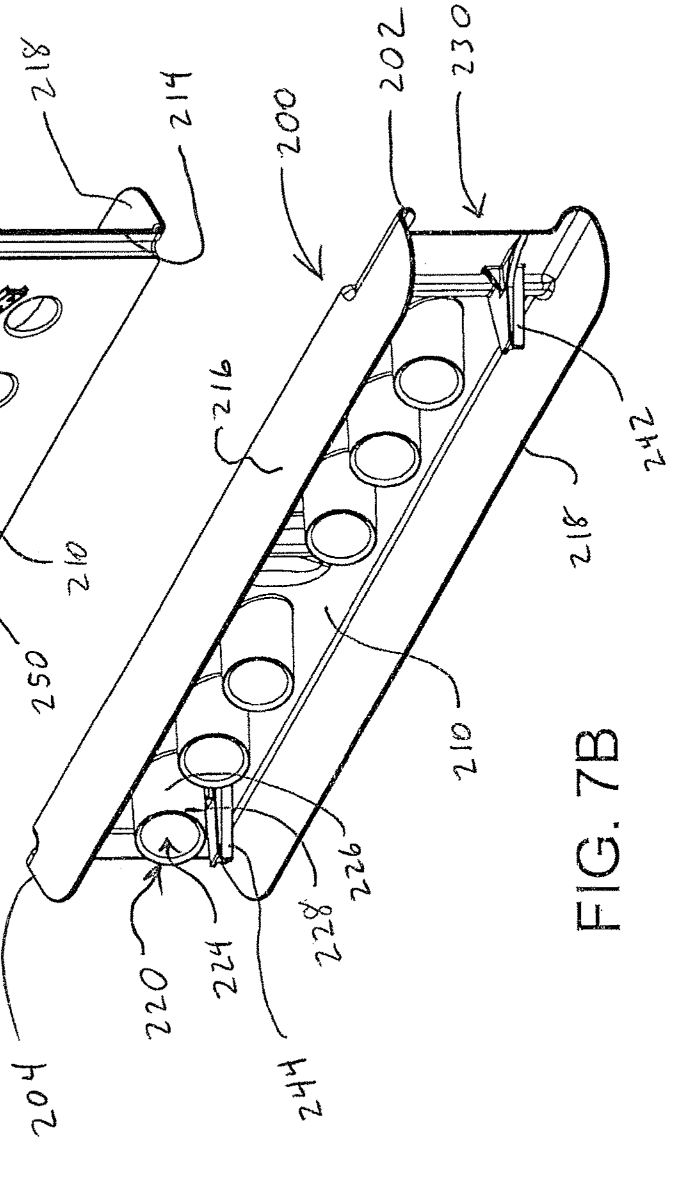
FIG. 7B is a perspective view of the jet channel of FIG. 7A shown at a different angle than FIG. 7A.
Figure 7C:
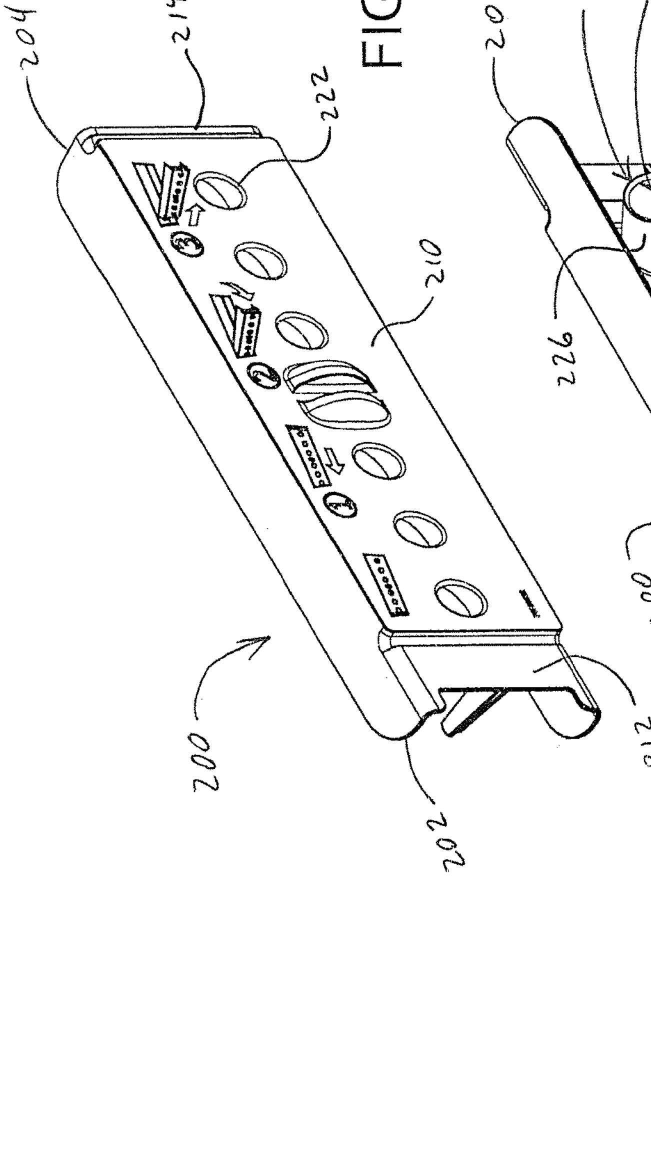
FIG. 7C is a perspective view of the jet channel of FIG. 7A shown at a different angle than FIG. 7A.
Figure 7D:
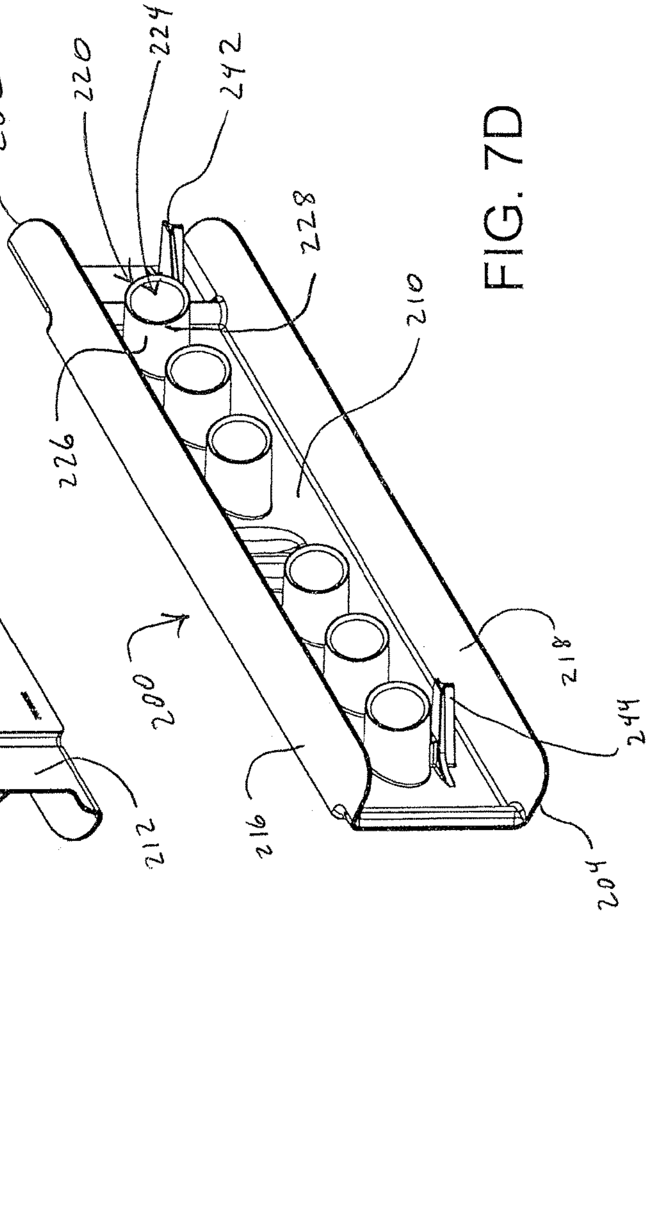
FIG. 7D is a perspective view of the jet channel of FIG. 7A shown at a different angle than FIG. 7A.
Figures 8A, 8B, 8C:
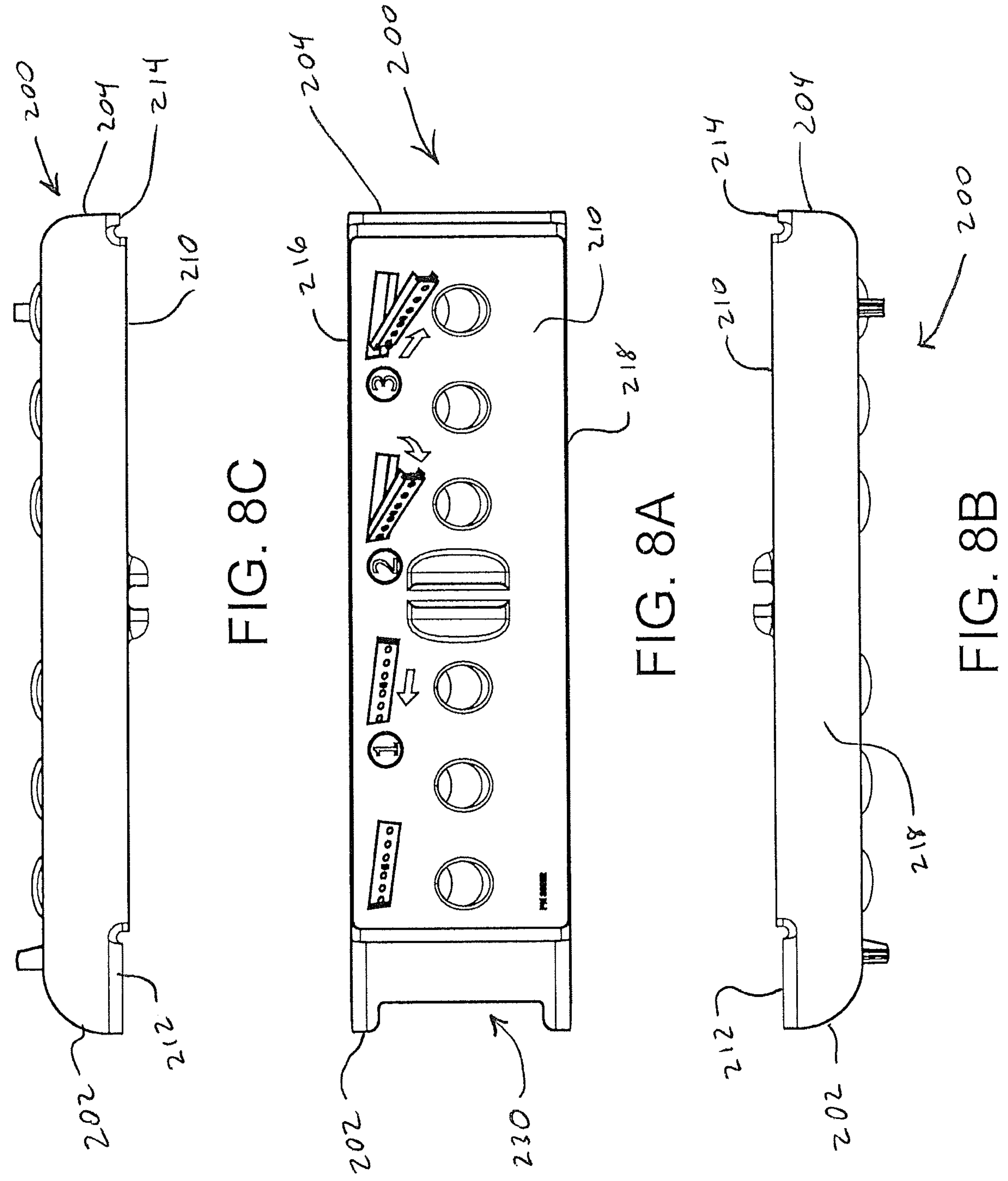
FIG. 8A is a front view of the jet channel of FIG. 7A.
FIG. 8B is a bottom view of the jet channel of FIG. 8A.
FIG. 8C is a top view of the jet channel of FIG. 8A.
Figure 8D:
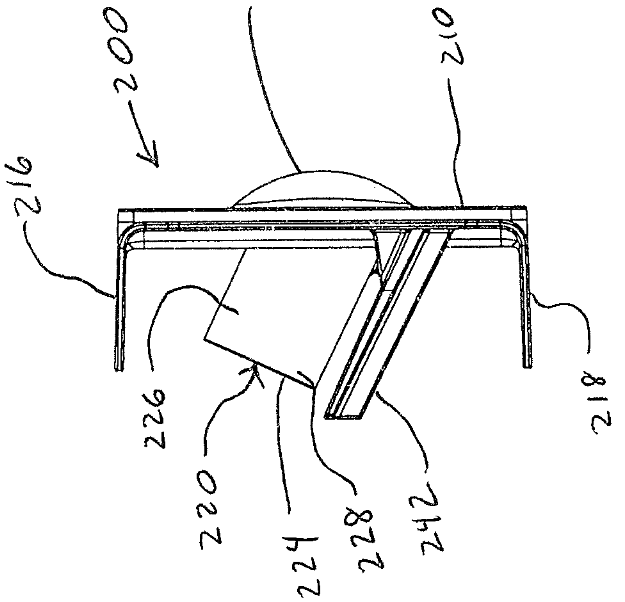
FIG. 8D is an end view of a proximal end of the jet channel of FIG. 8A.
Figure 8E:
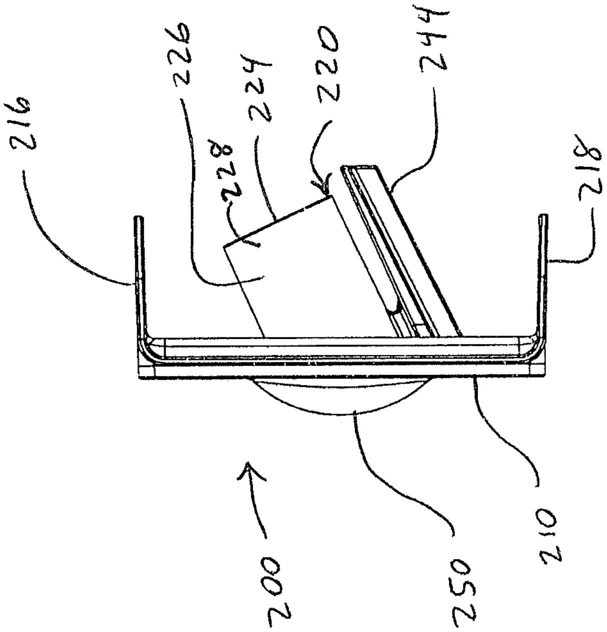
FIG. 8E is an end view of a distal end of the jet channel of FIG. 8A.

Referring to FIGS. 6B and 6C, a preferred embodiment of the discharge manifold 160 includes a vertical back wall 169 with top 166 and bottom 168 walls extending forward from opposed top and bottom edges of the back wall 169 towards the rear side wall 116 of the wash tank 110. It will be appreciated that in some embodiments, the discharge manifold 160 is integrated with the rear side wall 116 of the wash tank 110. The back 169, top 166, and bottom 168 walls, together, define an interior area 170 of said discharge manifold 160. In some such embodiments, the back wall 169 is relatively flat and the top 166 and bottom 168 walls each extend relatively perpendicularly forward from, but slightly angled outward from, the back wall 169 such that the top 166 and bottom 168 walls are relatively parallel but slightly angled away from each other. In this way, a front portion of the interior area 170 is slightly taller than a rear portion of the interior area 170.

In a preferred embodiment, at least a portion of the jet channel 200 is configured to be received by at least a portion of the discharge manifold 160 so as to create an enclosed channel and/or to conceal at least a portion of the interior area 170 of the discharge manifold 160. In some embodiments, the top 216 and bottom 218 flanges of the jet channel 200 extend into the discharge manifold 160 such that respective outer surfaces of the top 216 and bottom 218 flanges of the jet channel 200 nest against respective inner surfaces of respective top 166 and bottom 168 walls of the discharge manifold 160. In some such embodiments, the jet channel 200 and the discharge manifold 160 are configured such that as the jet channel 200 is inserted further into the discharge manifold 160, the top 166 and bottom 168 walls of the discharge manifold 160 force the top 216 and bottom 218 flanges of the jet channel 200 inward towards each other. In this way, a normal force is created between the top 166 and bottom 168 walls and respective top 216 and bottom 218 flanges so as to create a seal between top 166 and bottom 168 walls and respective top 216 and bottom 218 flanges and/or to prevent or inhibit the jet channel 200 from being inserted too far into the discharge manifold 160.

Referring to FIG. 5A and FIGS. 9A-9C, a preferred embodiment of the discharge manifold 160 further includes proximal 172 and distal 174 front walls positioned adjacent to respective proximal 162 and distal 164 ends of the discharge manifold 160. In some embodiments, each of the proximal 172 and distal 174 front walls extend between the top 166 and bottom 168 walls of the discharge manifold 160 and nest against an outer surface of the rear side wall 116 of the wash tank 110. In some such embodiments, the rear side wall 116 of the wash tank 110 includes a cutout that extends approximately between the top 166, bottom 168, proximal front 172, and distal front 174, walls of the discharge manifold 160 so as to allow a jet channel 200 to be received by the discharge manifold 160 through the cutout in the rear side wall 116 of the wash tank 110.

In a preferred embodiment, the jet channel 200 further includes proximal 212 and distal 214 recessed panels positioned adjacent to respective proximal 202 and distal 204 ends of the jet channel 200. In some embodiments, the recessed panels 212, 214 extend between the top 216 and bottom 218 flanges and are parallel with, but slightly recessed aft of, the front panel 210. In some such embodiments, the proximal 212 and distal 214 recessed panels are configured to engage with respective proximal 172 and distal 174 front walls of the discharge manifold 160 when the jet channel 200 is in a locked configuration so as to create a seal between respective front surfaces of the recessed panels 212, 214 and respective aft surfaces of respective front walls 172, 174 and/or to prevent or inhibit the jet channel 200 from being expelled from the discharge manifold 160 during operation. In other such embodiments, a front surface of the front panel 210 of the jet channel 200 is relatively flush with an inner surface of the rear side wall 116 of the wash tank 110 when the jet channel 200 is in the locked configuration.

Referring to FIGS. 7A-8E, some embodiments of the front panel 210 define a plurality of nozzle apertures 222. In some such embodiments, a continuous wall 226 of the jet nozzle 220 extends aft and upwards from each nozzle aperture 222. A distal end 228 of each continuous wall 226 defines a nozzle inlet 224 of each jet nozzle 220, each nozzle inlet 224 being positioned above and behind a respective nozzle aperture 222. In this way, when the washing machine 100 is operating, each jet nozzle 220 defines a passageway directing a jet of washing fluid downwardly into the volume of washing fluid in the wash tank 110.

In use, washing fluid in the discharge manifold 160 generally flows from an open proximal end 162 of the discharge manifold 160 towards a closed distal end 164 of the discharge manifold 160. In this way, the flow of the washing fluid exerts a net force on the continuous walls 226 of the jet nozzles 220 so as to bias the jet channel 200 towards the locked configuration. Furthermore, as the pump 150 increases pressure in the discharge manifold 160 relative to pressure in the wash tank 110, the recessed panels 212, 214 of the jet channel 200 are forced against respective front walls 172, 174 of the discharge manifold 160 so as to create and/or preserve a seal between the jet channel 200 and the discharge manifold 160, thereby forcing washing fluid out the jet nozzles 220 of the jet channel 200 into the wash tank 110. In some such embodiments, the distal end 164 of the discharge manifold 160 includes a distal end wall 175 extending between top 166, bottom 168, back 169, and distal front 174 walls so as to create a closed distal end 164.

In a preferred embodiment, when the washing machine 100 is not operating, a user is able to move the jet channel 200 from the locked configuration to the unlocked configuration by sliding the jet channel 200 towards the proximal end 162 of the discharge manifold 160. In other embodiments, a user is able to move the jet channel 200 from the unlocked configuration to the rotated configuration by rotating the distal end 204 of the jet channel 200 away from the distal end 164 of the discharge manifold 160. In still other embodiments, a user is able to remove the jet channel 200 from the washing machine 100 when the jet channel 200 is in the rotated configuration by moving the proximal end 202 of the jet channel 200 laterally away from the proximal end 162 of the discharge manifold 160 until the jet channel 200 is removed from the washing machine 100. In still other embodiments, a user is able to move the jet channel 200 between locked, unlocked, and rotated configurations, and/or is able to remove the jet channel 200 from the washing machine 100, without the use of tools.

In a preferred embodiment, a user is able to clean the interior area 170 of the discharge manifold 160 when the jet channel 200 is removed from the washing machine 100. In some such embodiments, the user is then able to reinstall the old jet channel 200 or install a new jet channel 200 by positioning the proximal end 202 of the jet channel 200 within the interior area 170 of the discharge manifold 160, sliding the proximal end 202 of the jet channel 200 towards the proximal end 162 of the discharge manifold 160 until the jet channel 200 is in the rotated configuration, rotating the distal end 204 of the jet channel 200 towards the distal end 164 of the discharge manifold 160 until the jet channel 200 is in the unlocked configuration, and sliding the distal end 204 of the jet channel 200 towards the distal end 164 of the discharge manifold 160 until the jet channel 200 is in the locked configuration.

Some embodiments of washing machines 100 include one or more discharge guard rod 155 positioned in or near the proximal end 162 of the discharge manifold 160. In some such embodiments, the one or more discharge guard rod 155 is configured to prevent or inhibit a user from reaching into the interior volume 156 of the pump 150 and/or from otherwise being harmed by the impeller 158 of the pump 150. In some embodiments, the proximal end 202 of the jet channel 200 defines a clearance profile 230 that is configured to provide clearance between the one or more discharge guard rod 155 and the proximal end 202 of the jet channel 200 when the jet channel 200 is in the rotated configuration, when the jet channel 200 is in the unlocked configuration, and/or when the jet channel 200 is moving between the rotated configuration and the unlocked configuration. In some such embodiments, the distal end 204 of the jet channel 200 does not include a clearance profile. In this way, the distal end 204 of the jet channel 200 prevents the jet channel 200 from being moved to the rotated configuration, the unlocked, and/or the locked configuration in the event that a user tries to install the jet channel 200 upside down.

In some embodiments, the jet channel 200, the discharge manifold 160, and/or the wash tank 110 includes one or more means of decreasing the likelihood or even eliminating the possibility that a user will install the jet channel 200 improperly. For instance, some embodiments of the jet channel 200 include pictures of the jet channel 200 with instructions, such as directional arrows, for installing and/or removing a jet channel 200. In this way, the jet channel 200 communicates proper installation techniques to a user, thereby increasing the likelihood that the jet channel 200 will be installed properly. Other embodiments of the jet channel 200 further include one or more catch feature 242, 244 that is configured to catch one or more feature of the discharge manifold 160 and/or the wash tank 110 in the event that a user tries to install the jet channel 200 backwards.

One embodiment of the catch feature 242, 244 of the jet channel 200 is a proximal 242 and/or distal 244 tab extending from a rear surface of the front panel 210 and/or the respective proximal 212 or distal 214 recessed panel of the jet channel 200. In some such embodiments, the proximal 242 and/or distal 244 tabs extend aft and upwards from the front panel 210 and/or the respective proximal 212 or distal 214 recessed panel at approximately the same angle that the continuous walls 226 of the jet nozzles 220 extend aft and upward from each nozzle aperture 222. In other such embodiments, the proximal 242 and/or distal 244 tabs extend beyond the top 216 and/or bottom 218 flanges of the jet channel 200.

In some embodiments, the proximal tab 242 is configured to catch the proximal front wall 172 of the discharge manifold 160 in the event that a user tries to install the jet channel 200 backwards. In this way, the proximal tab 242 of the jet channel 200 prevents the jet channel 200 from being installed backwards.

In other embodiments, the distal tab 244 is configured to catch the proximal front wall 172 of the discharge manifold 160 in the event that a user tries to install the jet channel 200 upside down and backwards. In this way, the distal tab 244 of the jet channel 200 prevents the jet channel 200 from being installed upside down and backwards.

In still other embodiments, the proximal 242 and/or distal 244 tabs of the jet channel 200 are configured to contact the back wall 169 of the discharge manifold 160 in the event that a user tries to install the jet channel 200 too far back relative to the discharge manifold 160. Consequently, in some such embodiments, the proximal 242 and/or distal 244 tabs of the jet channel 200 prevent the jet channel 200 from being installed too far into the discharge manifold 160. In this way, the discharge manifold 160 and/or the jet channel 200 are less likely to be damaged by the installation of the jet channel 200. Furthermore, in this way, the jet channel 200 and the discharge manifold 160 are more likely to create a seal between respective front surfaces of the recessed panels 212, 214 of the jet channel 200 and respective aft surfaces of respective front walls 172, 174 of the discharge manifold 160.

In yet other embodiments, the jet channel 200 includes one or more partition slot 250 for selectively receiving one or more partitioning wall 130. In some such embodiments, the one or more partitioning wall 130 keys to the one or more partition slot 250 when the jet channel 200 is in the locked configuration so as to maintain the jet channel 200 in the locked configuration.

Referring to FIGS. 10A-10D, some embodiments of the washing machine 100 include an accessory 400, such as a produce cutter. In some such embodiments, the accessory 400 is coupled to a drain board 105 of the washing machine 100. In other embodiments, the accessory 400 is selectively coupled to a mount assembly 410. In some such embodiments, the mount assembly 410 includes a latch 420 that is movable between a latched configuration and an unlatched configuration. In the latched configuration, the latch 420 secures the accessory 400 to the mount assembly 410. In the unlatched configuration, the latch 420 allows the accessory 400 to be installed onto or removed from the mount assembly 410. In this way, the accessory 400 can be easily removed from the washing machine 100 so as to enable the accessory 400 to be cleaned and/or replaced.

In some embodiments, the mount assembly 410 is movable between a secured configuration and an unsecured configuration. In some such embodiments, the mount assembly 410 includes a bottom panel 412 that defines a plurality of keyholes 414 and the washing machine 100 includes a plurality of corresponding studs 450 extending vertically upward from the drain board 105. In the secured configuration, the studs 450 are received by the keyholes 414 such that the studs 450 prevent the mount assembly 410 from moving vertically and inhibit the mount assembly 410 from moving laterally. In this way, the studs 450 secure the mount assembly 410, and thereby the accessory 400, to the washing machine 100. In the unsecured configuration, the studs 450 are received by the keyholes 414 such that the studs 450 do not prevent the mount assembly 410 from moving vertically. In this way, the mount assembly 410 can be easily removed from the washing machine 100 so as to enable the mount assembly 410 and/or the washing machine 100 to be cleaned. In some such embodiments, the mount assembly 410 is moved between the secured and unsecured configurations by translating and/or rotating the mount assembly 410 along a horizontal plane.

Referring to FIGS. 11A-15B, some embodiments of the washing machine 100 include a purging system 300 having a selector valve 310 in selective fluid communication with a plurality of purging ports 330. Each purging port 330 is configured to direct purging fluid into a concealed area of the washing machine 100, such as the interior volume 156 of the pump 150, so as to direct debris out of the concealed area and towards the discharge manifold 160 and/or the wash tank 110.

The selector valve 310 is in fluid communication with a fluid source and is moveable between multiple output configurations such that flow of purging fluid from the fluid source is controlled by the selector valve 310. In some such embodiments, the purging system 300 further includes a selector dial 312 to assist a user in moving the selector valve 310 between configurations and/or to provide an indication of which configuration the selector valve 310 is in, while in other embodiments the selector valve is automated through the use of actuators, solenoids and/or a computer or other suitable controller.

In use, the selector valve 310 is sequentially moved from a first configuration to a last configuration and then back to the first configuration so as to complete a firing sequence, with each configuration representing a firing step. In some embodiments, the selector valve 310 is moved directly from the last configuration to the first configuration to complete the firing sequence. In other embodiments, the selector valve 310 is moved through each intermediate configuration in reverse order from the last configuration to the first configuration to complete the firing sequence. It will be appreciated that in still other embodiments, a firing sequence includes one or more non-sequential firing steps and/or one or more configuration is skipped completely.

In a preferred embodiment, a firing sequence is conducted once while the pump 150 is idle and again while the pump 150 is pumping washing fluid. In some embodiments, the duration of each firing step in a firing sequence is approximately five (5) seconds. In some such embodiments, the duration of the firing step is achieved by a user turning the selector dial 312 to a particular position and dwelling on that position for approximately five (5) seconds. It will be appreciated that in other embodiments, the duration of one or more firing step of one or more firing sequence is greater than or less than five (5) seconds. It will also be appreciated that, in still other embodiments, one or more additional firing sequences and/or partial firing sequences are conducted while the pump 150 is idle and/or while the pump 150 is pumping washing fluid.

In some embodiments, the purging fluid is tap water and the local tap is the source of the purging fluid for the purging system 300. As such, in some such embodiments, the fluid pressure and fluid flow rate of the purging fluid are approximately equal to respective local water pressure and flow rate. In some such embodiments, the purging fluid is tap water provided at a minimum pressure of fifty (50) pounds per square inch and a minimum flow rate of ten (10) gallons per minute. In other embodiments, the purging fluid is not tap water (for example, in some embodiments, the fluid source is the wash tank) and/or is provided at a pressure and/or at a flow rate other than the local tap water pressure and/or flow rate.

In some embodiments, the jet channel 200 includes one or more jet through which water flows from a discharge manifold or other volume into a wash tank or other volume. In other embodiments, the jet channel includes one or more other feature for directing and/or inhibiting flow of water. In still other embodiments, the jet channel 200 is a channel having a vertical front panel 210 with top 216 and bottom 218 flanges extending aft from opposed top and bottom edges of the front panel 210. In some such embodiments, the channel 200 is configured to at least partially enclose one or more interior volume. In other such embodiments, the channel 200 does not include any jet channels. Instill other such embodiments, the channel 200 does not include any other feature for directing or inhibiting flow of water other than the front panel 210 and the top 216 and bottom 218 flanges. In still other embodiments, one or more of the front panel 210, top flange 216, and bottom flange 218 is omitted, replaced, or otherwise modified to facilitate interfacing with one or more feature of a discharge manifold or other structure defining an interior area. In still other embodiments, the channel 200 is configured to interface with one or more other feature so as to at least partially conceal an interior area defined by the channel 200.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:

1. A continuous motion style washing machine comprising:

a wash tank for selectively holding a volume of washing fluid;

a pump having an inlet and an outlet, said pump being in fluid communication with the volume of washing fluid;

a discharge manifold coupled to said wash tank and said outlet of said pump such that washing fluid flowing from said outlet of said pump flows into an interior area of said discharge manifold prior to flowing into said wash tank; and a jet channel selectively positioned relative to said discharge manifold, wherein said jet channel is movable between a locked configuration and an unlocked configuration by sliding said jet channel respectively towards and away from a proximal end of said discharge manifold, wherein said jet channel conceals at least a portion of said interior area of said discharge manifold when said jet channel is in the locked configuration, wherein said jet channel is selectively removable from the washing machine when said jet channel is in the unlocked configuration, and wherein removing said jet channel from the washing machine exposes at least a portion of said interior area of said discharge manifold to allow a user to view or access said portion of said interior area of said discharge manifold.

2. The washing machine of claim 1, wherein moving said jet channel from the locked configuration to the unlocked configuration and removing said jet channel from the washing machine are accomplished by hand without the use of tools.

3. The washing machine of claim 2, wherein moving said jet channel from the locked configuration to the unlocked configuration is further accomplished by sliding a distal end of said jet channel laterally away from a distal end of said discharge manifold.

4. The washing machine of claim 3, wherein said channel comprises a partition slot for selectively receiving one or more partitioning wall when said jet channel is in the locked configuration to prevent said jet channel from moving to the unlocked configuration.

5. The washing machine of claim 3, wherein removing said jet channel from the washing machine is accomplished by rotating said distal end of said jet channel away from said distal end of said discharge manifold to move said jet channel into a rotated configuration and then sliding a proximal end of said jet channel laterally away from said proximal end of said discharge manifold until said jet channel is removed from the washing machine.

6. The washing machine of claim 1, wherein:

said discharge manifold comprises:

a vertical back wall having opposed top and bottom edges; and top and bottom walls extending forward from respective top and bottom edges of said vertical back wall, wherein said back, top, and bottom walls of said discharge manifold, together, define at least part of said interior area of said discharge manifold;

said jet channel comprises:

a vertical front panel having opposed top and bottom edges; and top and bottom flanges extending aft from respective top and bottom edges of said vertical front panel; and at least a portion of said jet channel is configured to be received by at least a portion of said discharge manifold when said jet channel is in the locked configuration.

7. The washing machine of claim 6, wherein said top and bottom flanges of said jet channel extend at least partially into said discharge manifold when said jet channel is in the locked configuration such that an outer surface of said top and bottom flanges of said jet channel nests against an inner surface of respective top and bottom walls of said discharge manifold so as to create a seal between said top and bottom flanges of said jet channel and respective top and bottom walls of said discharge manifold.

8. The washing machine of claim 7, wherein:

said back wall of said discharge manifold is relatively flat;

said top and bottom walls of said discharge manifold each extend relatively perpendicularly but slightly angled outward from said back wall of said discharge manifold such that said top and bottom walls are relatively parallel but slightly angled away from each other;

said front panel of said jet channel is relatively flat; and said top and bottom flanges of said jet channel each extend relatively perpendicularly outward from said front panel of said jet channel such that said top and bottom flanges are relatively parallel to each other.

9. The washing machine of claim 8, wherein said jet channel and said discharge manifold are configured such that as said jet channel is inserted further into said discharge manifold, said top and bottom walls of said discharge manifold bias said top and bottom flanges of said jet channel inward towards each other, thereby creating the seal between said top and bottom flanges of said jet channel and respective top and bottom walls of said discharge manifold.

10. The washing machine of claim 6, wherein:

said discharge manifold further comprises proximal and distal front walls positioned respectively adjacent to said proximal end and a distal end of said discharge manifold, said front walls being displaced from said back wall and extending between said top and bottom walls, thereby defining an opening in said discharge manifold;

said jet channel further comprises proximal and distal recessed panels positioned adjacent to respective proximal and distal ends of said jet channel, said recessed panels extending between said top and bottom flanges and being parallel with, but slightly recessed from, said front panel; and said recessed panels of said jet channel are configured to engage with respective front walls of said discharge manifold when said jet channel is in the locked configuration so as to create a seal between a front surface of said recessed panels and an aft surface of respective front walls of said discharge manifold.

11. The washing machine of claim 10, wherein:

said discharge manifold is coupled to a wall of said wash tank;

said wall of said wash tank includes a cutout that extends approximately between said top, bottom, proximal front, and distal front walls of said discharge manifold so as to allow said jet channel to be received by said discharge manifold through said cutout in said wall of said wash tank and said opening in said discharge manifold; and a front surface of said front panel of said jet channel is relatively flush with an inner surface of said wall of said wash tank when said jet channel is in the locked configuration.

12. The washing machine of claim 10, wherein said jet channel further includes proximal and distal tabs extending aft of said front panel and being configured to contact said proximal front wall of said discharge manifold in the event a user tries to install said jet channel backwards.

13. The washing machine of claim 1, further comprising a purging system, the purging system comprising a plurality of purging ports, each purging port being configured to direct purging fluid into a concealed area of the washing machine, and a selector valve in selective fluid communication with each purging port so as to accommodate one or more firing sequences of purging fluid through one or more of said purging ports for directing debris out of said concealed area of the washing machine and towards said wash tank.

14. The washing machine of claim 1, wherein said jet channel includes one or more jet nozzle and wherein at least some of the washing fluid flowing into said interior area of said discharge manifold flows through said one or more jet nozzle and into said wash tank when said jet channel is in the locked configuration.

15. A method of cleaning an interior area of a discharge manifold of a continuous motion style washing machine, the method comprising:

moving a jet channel from a locked configuration to an unlocked configuration by sliding said jet channel towards a proximal end of said discharge manifold, wherein said jet channel is coupled to said washing machine and secured in position relative to said discharge manifold when said jet channel is in the locked configuration;

moving the jet channel from the unlocked configuration to a rotated configuration;

removing the jet channel from said washing machine; and cleaning said interior area of said discharge manifold;

wherein said interior area of said discharge manifold is concealed when said jet channel is in the locked configuration; and wherein said interior area of said discharge manifold is exposed when said jet channel is removed from said washing machine.

16. The method of claim 15, wherein moving said jet channel from the locked configuration to the unlocked configuration, moving said jet channel from the unlocked configuration to the rotated configuration, and removing said jet channel from the washing machine are all accomplished by hand without the use of tools.

17. The method of claim 15, wherein at least a portion of said jet channel is received by at least a portion of said discharge manifold when said discharge manifold is in the locked configuration.

18. The method of claim 15, wherein moving said jet channel from the locked configuration to the unlocked configuration is further accomplished by sliding a distal end of said jet channel laterally away from a distal end of said discharge manifold.

19. The method of claim 15, wherein moving said jet channel from the unlocked configuration to the rotated configuration is further accomplished by rotating said distal end of said jet channel away from said distal end of said discharge manifold.

20. The method of claim 15, wherein removing said jet channel from said washing machine is accomplished by sliding a proximal end of said jet channel laterally away from a proximal end of said discharge manifold until said jet channel is removed from the washing machine.

* * * * *